(12) United States Patent
Ahmad et al.

(10) Patent No.: US 12,081,460 B2
(45) Date of Patent: Sep. 3, 2024

(54) OUT-OF-ORDER DATA PACKET PROCESSING IN A WIRELESS COMMUNICATIONS SYSTEM (WCS)

(71) Applicant: Corning Research & Development Corporation, Corning, NY (US)

(72) Inventors: Syed Noman Ahmad, San Jose, CA (US); Pushkar Upadhyay, Sunnyvale, CA (US)

(73) Assignee: Corning Research & Development Corporation, Corning, NY (US)

( * ) Notice: Subject to any disclaimer, the term of this patent is extended or adjusted under 35 U.S.C. 154(b) by 295 days.

(21) Appl. No.: 17/827,476

(22) Filed: May 27, 2022

(65) Prior Publication Data

US 2023/0388254 A1 Nov. 30, 2023

(51) Int. Cl.
*H04L 49/9057* (2022.01)
*H04L 47/56* (2022.01)
*H04W 28/08* (2023.01)

(52) U.S. Cl.
CPC .......... *H04L 49/9057* (2013.01); *H04L 47/56* (2013.01); *H04W 28/0908* (2020.05)

(58) Field of Classification Search
CPC . H04L 49/90; H04L 49/9005; H04L 49/9036; H04L 49/9047; H04L 49/9057; H04L 47/50; H04L 47/524; H04L 47/56; H04L 47/562; H04L 47/564; H04L 47/566; H04L 47/568; H04L 47/62; H04L 47/621; H04L 47/622; H04L 47/624; H04L 47/6295; H04W 28/0908
See application file for complete search history.

(56) References Cited

U.S. PATENT DOCUMENTS

| 8,194,690 | B1* | 6/2012 | Steele | H04L 49/90 |
| | | | | 370/413 |
| 8,570,224 | B2 | 10/2013 | Mattis | |
| 8,995,933 | B2 | 3/2015 | Waldvogel et al. | |
| 9,641,448 | B1* | 5/2017 | Telfer | H04L 47/624 |
| 9,886,273 | B1* | 2/2018 | Eldar | G06F 15/80 |
| 9,918,267 | B2 | 3/2018 | Plestid et al. | |
| 10,110,308 | B2 | 10/2018 | Harel et al. | |
| 10,470,074 | B2 | 11/2019 | Kashyap et al. | |
| 11,337,260 | B2 | 5/2022 | Youtz et al. | |

(Continued)

*Primary Examiner* — Kevin D Mew
(74) *Attorney, Agent, or Firm* — William D. Doyle

(57) ABSTRACT

Out-of-order packet processing in a wireless communications system (WCS) is provided. A reordering queue is established for each data session to temporally hold an incoming data packet(s) until an out-of-order data packet(s) is received or discarded. A reordering timer is initiated to define a lifespan of the earliest detected missed data packet in the data session. If the earliest detected missed data packet is received before the reordering timer expires, the received data packet will be forwarded to a core network together with any subsequent in-order data packet(s) in the reordering queue. Otherwise, the missed data packet is discarded, the subsequent in-order data packet(s) in the reordering queue is forwarded to the core network, and the reordering timer may be redefined for a next missed data packet in the data session. Hence, it is possible to process out-of-order data packets for multiple data sessions with reduced processing complexity and latency.

20 Claims, 21 Drawing Sheets

(56) References Cited

U.S. PATENT DOCUMENTS

| | | | |
|---|---|---|---|
| 2006/0262720 A1* | 11/2006 | Charny | H04L 49/9015 370/412 |
| 2013/0070584 A1* | 3/2013 | Hutchison | H04L 43/10 370/216 |
| 2014/0169378 A1* | 6/2014 | Shumsky | H04L 49/552 370/394 |
| 2019/0104207 A1* | 4/2019 | Goel | H04L 45/64 |
| 2019/0334637 A1* | 10/2019 | Koebele | H04B 17/364 |
| 2020/0169513 A1* | 5/2020 | Goel | H04L 69/40 |
| 2021/0297350 A1* | 9/2021 | Vegesna | H04L 49/25 |
| 2021/0320820 A1* | 10/2021 | Ruan | H04L 49/602 |

* cited by examiner

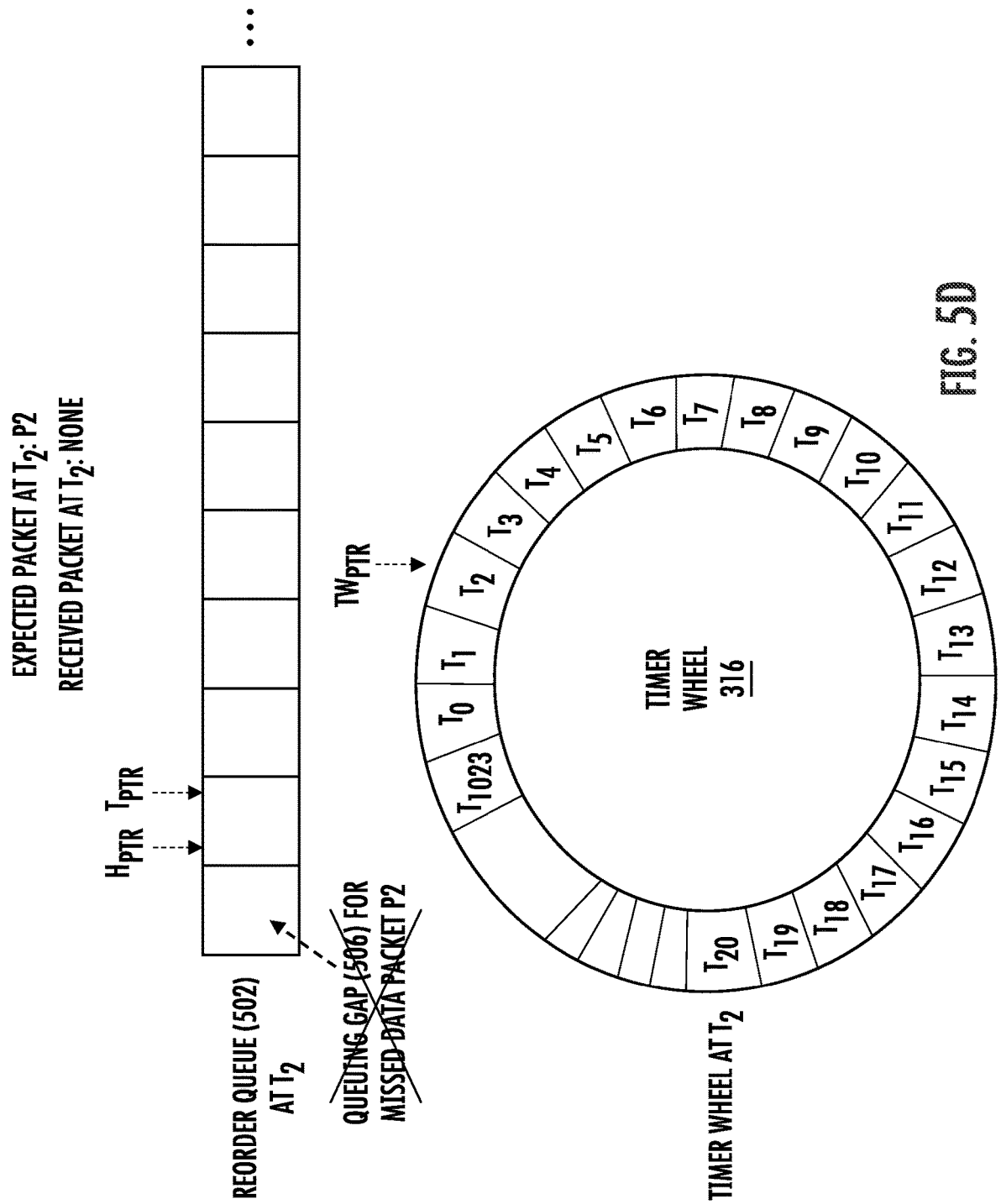

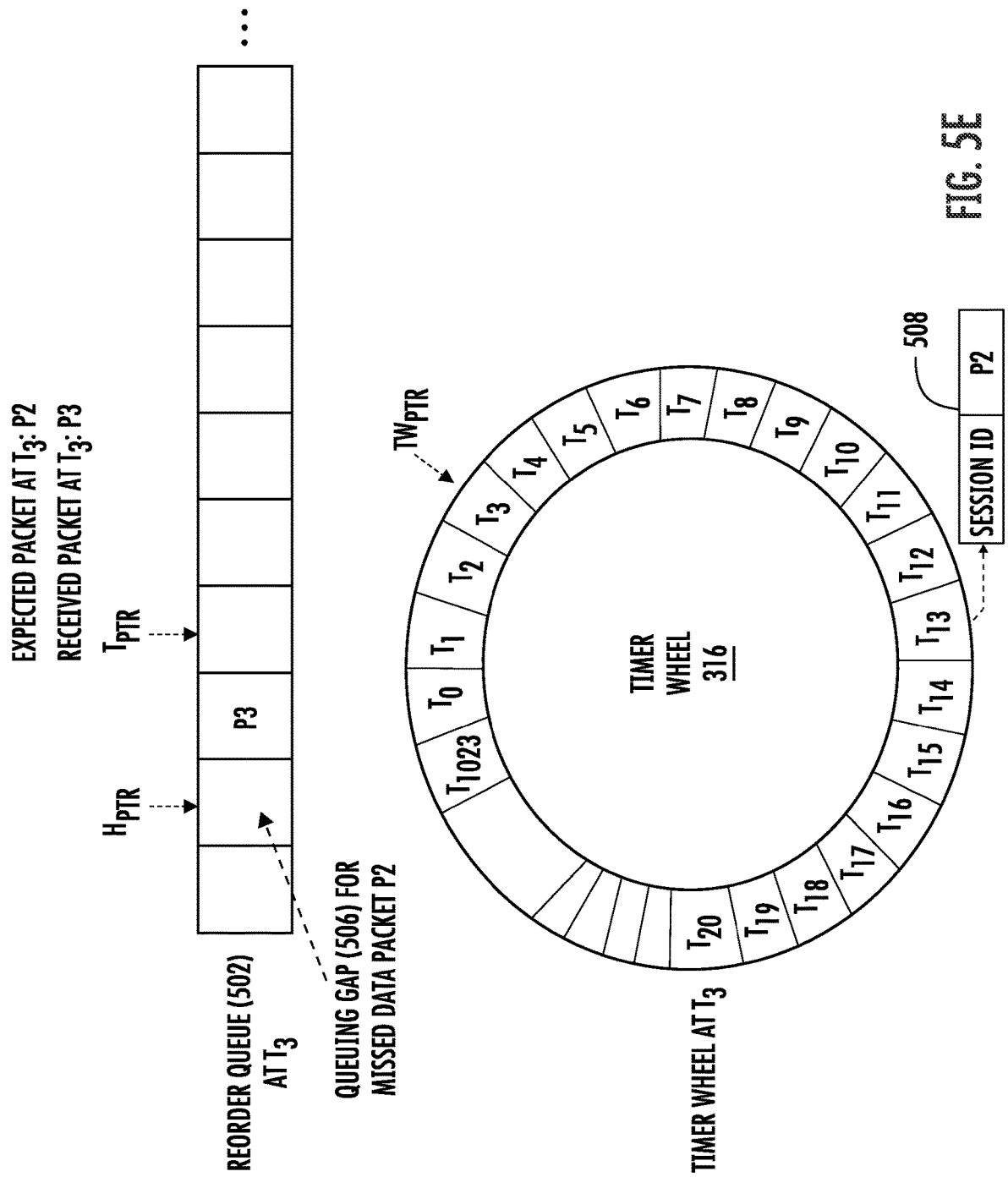

OUT-OF-ORDER DATA PACKET PROCESSING IN A WIRELESS COMMUNICATIONS SYSTEM (WCS)

BACKGROUND

The disclosure relates generally to out-of-order data packet processing in a wireless communications system (WCS), which can include a fifth generation (5G) or a 5G new-radio (5G-NR) system and/or a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (e.g., eNodeB or gNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective one of multiple core networks $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(N) for the communications signal streams 108(1)-108(S) to serve multiple wireless client devices 106(1)-106(W). For example, the multiple RF beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a fifth generation (5G) or a 5G new-radio (5G-NR) communications system. In this regard, the radio node 102 can function as a 5G or 5G-NR base station (a.k.a. gNodeB) to service the wireless client devices 106(1)-106(W). At any given time, the radio node 102 can establish one or more data sessions with each of the wireless client devices 106(1)-106(W) to receive data packets from the wireless client devices 106(1)-106(W). Accordingly, the radio node 102 may also establish one or more data sessions with each of the core networks $CN_1$-$CN_N$ to thereby forward the data packets received from the wireless client devices 106(1)-106(W) to the service providers 104(1)-104(N).

Understandably, the communications signal streams 108(1)-108(S) communicated wirelessly between the wireless client devices 106(1)-106(W) and the radio node 102 are highly susceptible to radio interference and/or propagation attenuation. As a result, data packets communicated from the wireless client devices 106(1)-106(W) to the radio node 102 can be lost from time to time. Although the radio node 102 typically employs such sophisticated retransmission schemes as automatic retransmission request (ARQ) and hybrid ARQ to help recover lost data packets, the recovered data packets may become out-of-order when arrive at the radio node 102. Consequently, the data packets communicated from the radio node 102 to the core networks $CN_1$-$CN_N$ may also become out-of-order. As such, it is desirable to detect and correct out-of-order data packets, preferably, prior to communicating the data packets to the core networks $CN_1$-$CN_N$. Moreover, it is desirable to detect and correct out-of-order data packets with reduced processing complexity and latency.

SUMMARY

Embodiments disclosed herein include out-of-order packet processing in a wireless communications system (WCS). In this regard, a process can be employed, for example, at a central unit of the WCS, to process out-of-order data packets for one or more data sessions. In an embodiment, a reordering queue is established for each of the data sessions to temporally hold an incoming data packet(s) until an out-of-order data packet(s) is either received or discarded. In addition, a reordering timer is initiated to define a lifespan of the earliest detected missed data packet in each of the data sessions. Specifically, if the earliest detected missed data packet is received before the reordering timer expires, the received data packet will be forwarded to a core network together with any subsequent in-order data packet(s) enqueued in the reordering queue. Otherwise, the missed data packet will be discarded, the subsequent in-order data packet(s) enqueued in the reordering queue will be forwarded to the core network, and the reordering timer may be redefined for a next missed data packet in the respective data session. By optimizing the reordering queue implementation (e.g., based on a single reordering timer for each of the data sessions), it is possible to concurrently detect and correct out-of-order data packets for multiple data sessions with reduced processing complexity and latency.

One exemplary embodiment of the disclosure relates to a central unit. The central unit includes a control circuit. The control circuit is configured to receive a plurality of data packets associated with a respective one of one or more data sessions. For each received data packet among the plurality of data packets associated with the respective one of the one or more data sessions, the control circuit is also configured to determine whether the received data packet is an expected data packet. For each received data packet among the plurality of data packets associated with the respective one of the one or more data sessions, in response to determining that the received data packet is the expected data packet, the control circuit is also configured to forward the received data packet to a core network node when a respective one of one or more reordering queues associated with the respective one of the one or more data sessions is empty. For each received data packet among the plurality of data packets associated with the respective one of the one or more data sessions, in response to determining that the received data packet is the expected data packet, the control circuit is also configured to enqueue the received data packet in the respective one of the one or more reordering queues when the respective one of the one or more reordering queues is not empty. For each received data packet among the plurality of data packets associated with the respective one of the one or more data sessions, the control circuit is also configured to update the respective one of the one or more reordering queues based on the received data packet in response to determining that the received data packet is not the expected data packet.

An additional exemplary embodiment of the disclosure relates to a method for supporting out-of-order packet processing in a WCS. The method includes receiving a plurality of data packets associated with a respective one of one or more data sessions. The method also includes for each received data packet among the plurality of data packets associated with the respective one of the one or more data sessions, determining whether the received data packet is an expected data packet. The method also includes, for each received data packet among the plurality of data packets associated with the respective one of the one or more data sessions, in response to determining that the received data packet is the expected data packet, forwarding the received data packet to a core network node when a respective one of one or more reordering queues associated with the respective one of the one or more data sessions is empty. The method also includes, for each received data packet among the plurality of data packets associated with the respective one of the one or more data sessions, in response to determining that the received data packet is the expected data packet, enqueuing the received data packet in the respective one of the one or more reordering queues when the respective one of the one or more reordering queues is not empty. The method also includes, for each received data packet among the plurality of data packets associated with the respective one of the one or more data sessions, updating the respective one of the one or more reordering queues based on the received data packet in response to determining that the received data packet is not the expected data packet.

An additional exemplary embodiment of the disclosure relates to a WCS. The WCS includes a central unit coupled to a core network. The central unit comprises a control circuit. The control circuit is configured to receive a plurality of data packets associated with a respective one of one or more data sessions. For each received data packet among the plurality of data packets associated with the respective one of the one or more data sessions, the control circuit is also configured to determine whether the received data packet is an expected data packet. For each received data packet among the plurality of data packets associated with the respective one of the one or more data sessions, in response to determining that the received data packet is the expected data packet, the control circuit is also configured to forward the received data packet to a core network node when a respective one of one or more reordering queues associated with the respective one of the one or more data sessions is empty. For each received data packet among the plurality of data packets associated with the respective one of the one or more data sessions, in response to determining that the received data packet is the expected data packet, the control circuit is also configured to enqueue the received data packet in the respective one of the one or more reordering queues when the respective one of the one or more reordering queues is not empty. For each received data packet among the plurality of data packets associated with the respective one of the one or more data sessions, the control circuit is also configured to update the respective one of the one or more reordering queues based on the received data packet in response to determining that the received data packet is not the expected data packet.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 5A-5L are schematic diagrams providing exemplary illustrations of a series of out-of-order data processing scenarios that can be handled by the central unit of FIG. 3 based on the process of FIG. 4;

DETAILED DESCRIPTION

Embodiments disclosed herein include out-of-order packet processing in a wireless communications system (WCS). In this regard, a process can be employed, for example, at a central unit of the WCS, to process out-of-order data packets for one or more data sessions. In an embodiment, a reordering queue is established for each of the data sessions to temporally hold an incoming data packet(s) until an out-of-order data packet(s) is either received or discarded. In addition, a reordering timer is initiated to define a lifespan of the earliest detected missed data packet in each of the data sessions. Specifically, if the earliest detected missed data packet is received before the reordering timer expires, the received data packet will be forwarded to a core network together with any subsequent in-order data packet(s) enqueued in the reordering queue. Otherwise, the missed data packet will be discarded, the subsequent in-order data packet(s) enqueued in the reordering queue will be forwarded to the core network, and the reordering timer may be redefined for a next missed data packet in the respective data session. By optimizing the reordering queue implementation (e.g., based on a single reordering timer for each of the data sessions), it is possible to concurrently detect and correct out-of-order data packets for multiple data sessions with reduced processing complexity and latency.

Figure 1:
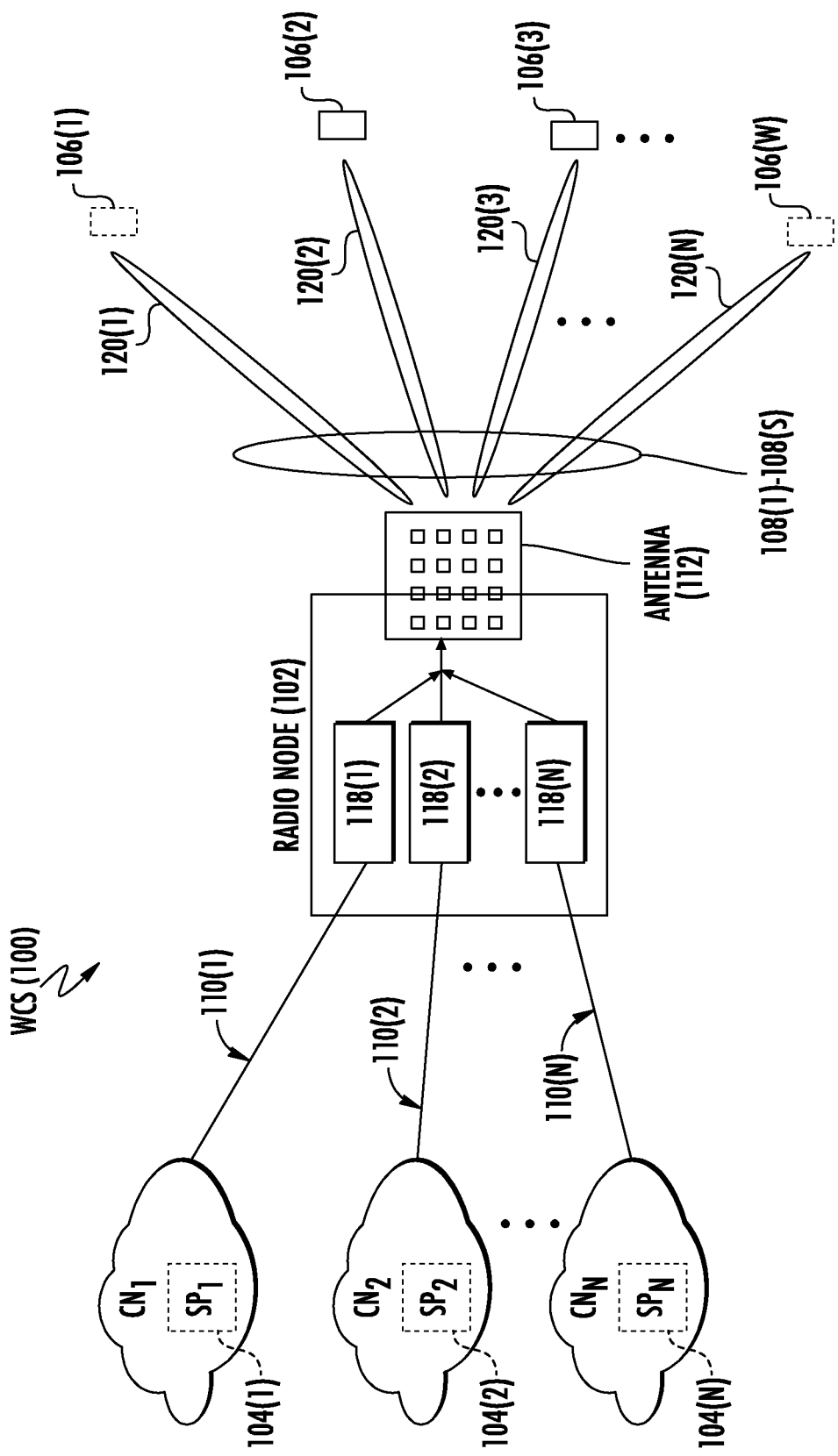
FIG. 1 is a schematic diagram of an exemplary wireless communications system (WCS), such as a distributed communications system (DCS), configured to distribute communications services to remote coverage areas.
Figure 2:
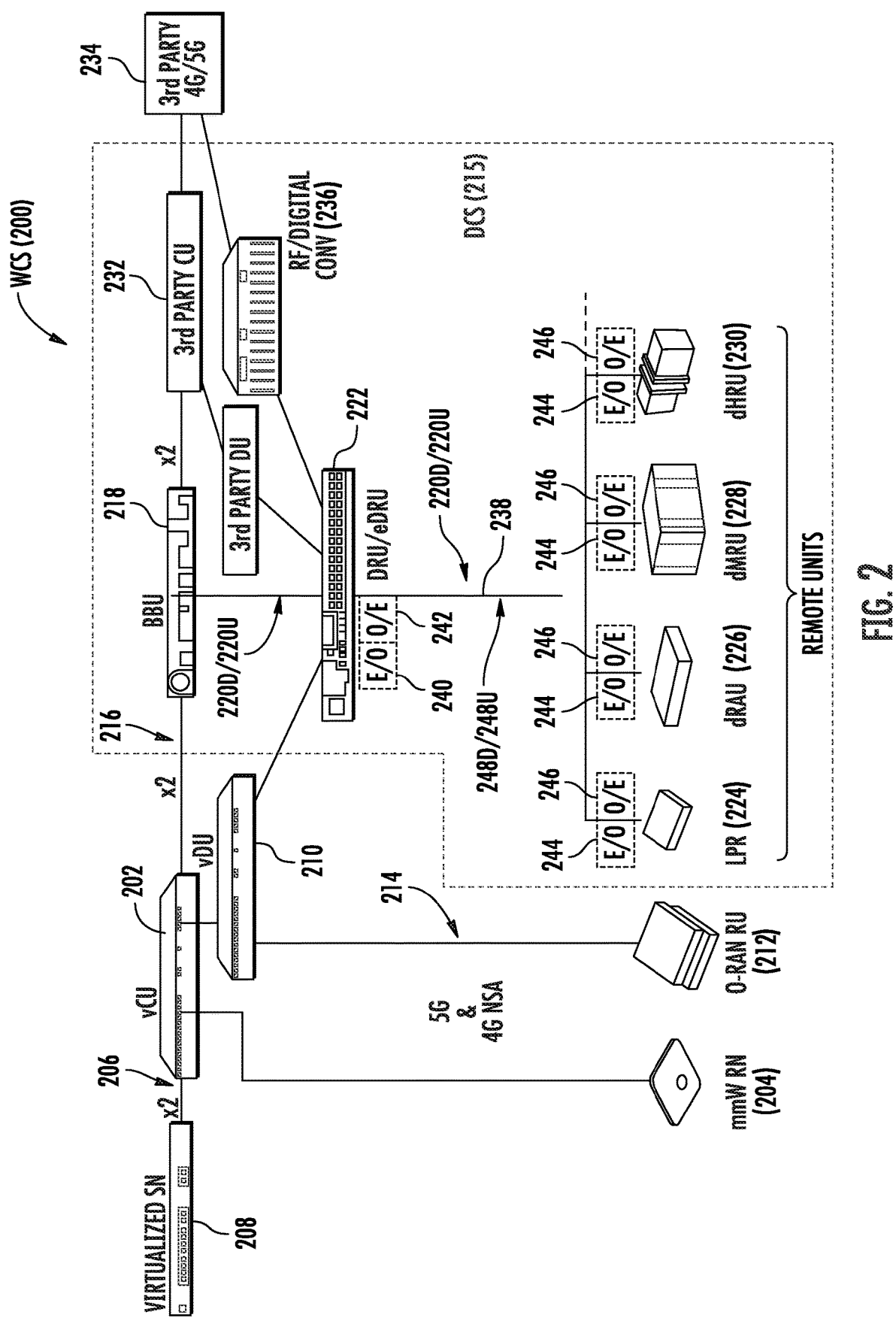
FIG. 2 is a schematic diagram of an exemplary WCS configured according to any embodiment disclosed herein to support out-of-order data packet processing.

In this regard, FIG. 2 is a schematic diagram of an exemplary WCS 200 configured according to any embodiment disclosed herein to support out-of-order data packet processing. The WCS 200 supports both legacy 4G LTE, 4G/5G non-standalone (NSA), and 5G standalone communications systems. As shown in FIG. 2, a centralized services node 202 is provided that is configured to interface with a core network to exchange communications data and distribute the communications data as radio signals to remote units. In this example, the centralized services node 202 is configured to support distributed communications services to an mmWave radio node 204. Despite that only one of the mmWave radio node 204 is shown in FIG. 2, it should be appreciated that the WCS 200 can be configured to include additional numbers of the mmWave radio node 204, as needed. The functions of the centralized services node 202 can be virtualized through an x2 interface 206 to another services node 208. The centralized services node 202 can also include one or more internal radio nodes that are configured to be interfaced with a distribution unit (DU) 210 to distribute communications signals to one or more open radio access network (O-RAN) remote units (RUs) 212 that are configured to be communicatively coupled through an O-RAN interface 214. The O-RAN RUs 212 are each configured to communicate downlink and uplink communications signals in a respective coverage cell.

The centralized services node 202 can also be interfaced with a distributed communications system (DCS) 215 through an x2 interface 216. Specifically, the centralized services node 202 can be interfaced with a digital baseband unit (BBU) 218 that can provide a digital signal source to the centralized services node 202. The digital BBU 218 may be configured to provide a signal source to the centralized services node 202 to provide downlink communications signals 220D to a digital routing unit (DRU) 222 as part of a digital distributed antenna system (DAS). The DRU 222 is configured to split and distribute the downlink communications signals 220D to different types of remote units, including a low-power remote unit (LPR) 224, a radio antenna unit (dRAU) 226, a mid-power remote unit (dMRU) 228, and a high-power remote unit (dHRU) 230. The DRU 222 is also configured to combine uplink communications signals 220U received from the LPR 224, the dRAU 226, the dMRU 228, and the dHRU 230 and provide the combined uplink communications signals to the digital BBU 218. The digital BBU 218 is also configured to interface with a third-party central unit 232 and/or an analog source 234 through a radio frequency (RF)/digital converter 236.

The DRU 222 may be coupled to the LPR 224, the dRAU 226, the dMRU 228, and the dHRU 230 via an optical fiber-based communications medium 238. In this regard, the DRU 222 can include a respective electrical-to-optical (E/O) converter 240 and a respective optical-to-electrical (O/E) converter 242. Likewise, each of the LPR 224, the dRAU 226, the dMRU 228, and the dHRU 230 can include a respective E/O converter 244 and a respective O/E converter 246.

The E/O converter 240 at the DRU 222 is configured to convert the downlink communications signals 220D into downlink optical communications signals 248D for distribution to the LPR 224, the dRAU 226, the dMRU 228, and the dHRU 230 via the optical fiber-based communications medium 238. The O/E converter 246 at each of the LPR 224, the dRAU 226, the dMRU 228, and the dHRU 230 is configured to convert the downlink optical communications signals 248D back to the downlink communications signals 220D. The E/O converter 244 at each of the LPR 224, the dRAU 226, the dMRU 228, and the dHRU 230 is configured to convert the uplink communications signals 220U into uplink optical communications signals 248U. The O/E converter 242 at the DRU 222 is configured to convert the uplink optical communications signals 248U back to the uplink communications signals 220U.

Notably, any of the O-RAN RUs 212, the mmWave radio node 204, and/or the DCS remote units, such as the LPR 224, the dRAU 226, the dMRU 228, and the dHRU 230, can establish one or more data sessions with the centralized services node 202 for communicating data packets that are received from respective user equipment (UEs). In this regard, any of the O-RAN RUs 212, the mmWave radio node 204, and/or the DCS remote units can produce out-of-order data packets at the centralized services node 202. Accordingly, the centralized services node 202 can be configured according to embodiments described herein to detect and correct the out-of-order data packets.

Figure 3:
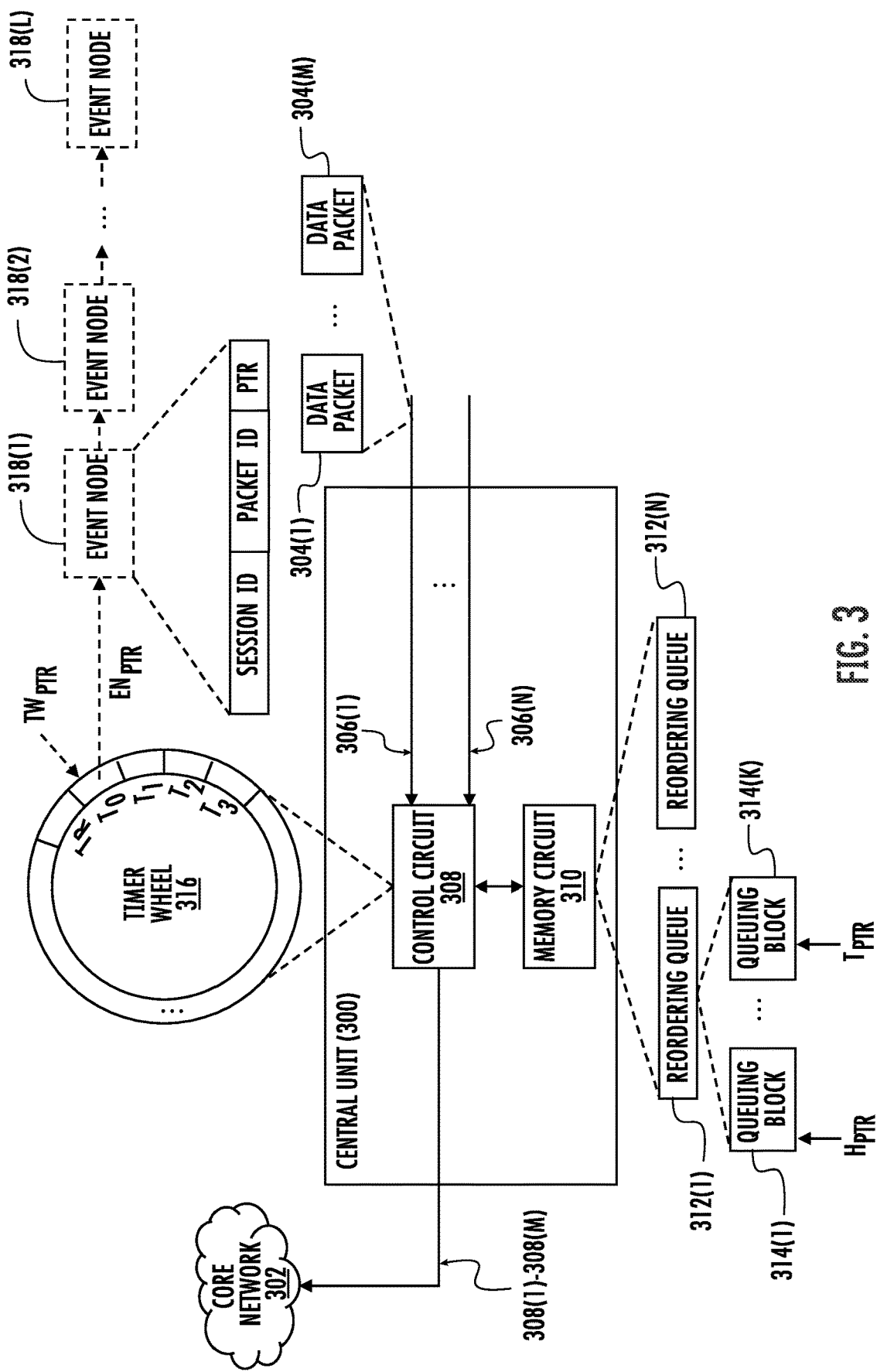
FIG. 3 is a schematic diagram of an exemplary central unit, which can be identical or functionally equivalent to a centralized services node in the WCS of FIG. 2, configured according to embodiments of the present disclosure to support out-of-order data packet processing.

In this regard, FIG. 3 is a schematic diagram of an exemplary central unit 300 configured according to embodiments of the present disclosure to support out-of-order data packet processing. The central unit 300, which can be identical or functionally equivalent to the centralized services node 202 in the WCS 200 of FIG. 2, is coupled to a core network 302, which can be identical or functionally equivalent to the services node 208 in FIG. 2. The central unit 300 is configured to receive a plurality of data packets 304(1)-304(M) in each of one or more data sessions 306(1)-306(N) and forward the data packets 304(1)-304(M) received in the data sessions 306(1)-306(N) to the core network 302.

Understandably, the data packets 304(1)-304(M) in each of the data sessions 306(1)-306(N) may be received by any of the O-RAN RUs 212, the mmWave radio node 204, and/or the DCS remote units in FIG. 2 over respective wireless connections. As such, some of the data packets 304(1)-304(M) in each of the data sessions 306(1)-306(N) may become out-of-order when arriving at the central unit 300. In this regard, the central unit 300 can be configured according to embodiments of the present disclosure to detect and correct the out-of-order data packets in the data sessions 306(1)-306(N) prior to forwarding the data packets 304(1)-304(M) in the data sessions 306(1)-306(N) to the core network 302.

In a non-limiting example, the central unit 300 includes a control circuit 308 and a memory circuit 310. The control circuit 308, which can be a field-programmable gate array (FPGA) or an application-specific integrated circuit (ASIC), as an example, can be configured to detect and correct one or more out-of-order data packets among the data packets 304(1)-304(M) in each of the data sessions 306(1)-306(N).

The memory circuit 310, which can include such storage mediums as random-access memory (RAM), flash memory, solid-state disk (SSD), as an example, is configured to store one or more reordering queues 312(1)-312(N), each corresponding to a respective one of the data sessions 306(1)-306(N). Each of the reordering queues 312(1)-312(N) can include a plurality of queuing blocks 314(1)-314(K). In a non-limiting example, each of the reordering queues 312(1)-312(N) can operate as a first-in first-out (FIFO) queue and each of the queuing blocks 314(1)-314(K) can be configured to hold a largest one of the data packets 304(1)-304(M). In an embodiment, the control circuit 308 is configured to maintain a respective head pointer HPTR and a respective tail pointer TPTR for each of the reordering queues 312(1)-312(N). In each of the reordering queues 312(1)-312(N), the head pointer HPTR indicates a first occupied queuing block among the queuing blocks 314(1)-314(K), while the tail pointer TPTR indicates a first unoccupied queuing block among the queuing blocks 314(1)-314(K).

In a conventional out-of-order data packet processing scheme, a dedicated timer is often needed to define a maximum wait time for each missed data packet in each of the data sessions 306(1)-306(N). In this regard, the control circuit 308 may have to simultaneously maintain hundreds, if not thousands, of timers to keep track of each missed data packet in each of the data sessions 306(1)-306(N). Accordingly, in response to receiving each missed data packet, the control circuit 308 must search through all the timers to locate and stop a corresponding timer associated with the missed data packet. Such a conventional out-of-order data packet processing scheme has several obvious drawbacks. First, it may require a large amount of memory to store the timers. Second, it takes away a substantial amount of processing resources from the control circuit 308. Third, it can significantly increase processing latency.

In this regard, to overcome the drawbacks of the conventional out-of-order data packet processing scheme, the control circuit 308 can be configured according to an embodiment of the present disclosure to support out-of-order data packet processing among the data sessions 306(1)-306(N) based on a common timer. As a result, it is possible to concurrently detect and correct out-of-order data packets among the data sessions 306(1)-306(N) with reduced processing complexity and latency.

In an embodiment, the common timer can be based on a timer wheel 316 that includes a plurality of timer slots $T_0$-$T_R$ (e.g., R=1023) each having a fixed duration (e.g., 1 millisecond). In this regard, instead of maintaining hundreds of timers like in the conventional scheme, the control circuit 308 only needs to maintain a single timer wheel pointer $TW_{PTR}$ and move the timer wheel pointer $TW_{PTR}$ clockwise from one timer slot to another after the fixed duration of each of the timer slots $T_0$-$T_R$.

In an embodiment, each of the timer slots $T_0$-$T_R$ may contain a respective event node pointer $EN_{PTR}$, which can point to a null node (a.k.a. null pointer), or one or more event nodes 318(1)-318(L). In other words, some of the timer slots $T_0$-$T_R$ may have one or more of the event nodes 318(1)-318(L) attached to them, while others may no event node attached. In a non-limiting example, each of the event nodes 318(1)-318(L) can include a session identification (ID), a packet ID, and a pointer PTR. Herein, the session ID identifies a respective one of the data sessions 306(1)-306(N), the packet ID that identifies a missed data packet (a.k.a. out-of-order data packet) among the data packets 304(1)-304(M) associated with the respective one of the data sessions 306(1)-306(N), and the pointer PTR connects to a succeeding one of the event nodes 318(1)-318(L).

At any given time, each of the data sessions 306(1)-306(N) can only have a single event node attached to any of the timer slots $T_0$-$T_R$. In this regard, only the earliest detected (a.k.a. oldest) missed data packet in a respective one of the data sessions 306(1)-306(N) is identified in a respective one of the event nodes 318(1)-318(L) attached to any of the timer slots $T_0$-$T_R$. Herein, the respective one of the event nodes 318(1)-318(L) is configured to indicate an expiration of a reordering timer for the missed data packet identified by the corresponding packet ID in the respective one of the event nodes 318(1)-318(L). In other words, the respective one of the event nodes 318(1)-318(L) represents an end of a lifespan of the missed data packet identified by the corresponding packet ID in the respective one of the event nodes 318(1)-318(L). In this regard, the control circuit 308 is configured to remove the respective one of the event nodes 318(1)-318(L) regardless of whether the corresponding missed data packet has been received. Subsequently, the control circuit 308 can attach an event node to a future one of the timer slots $T_0$-$T_R$ for a next missed data packet (e.g., a second oldest) associated with the respective one of the data sessions 306(1)-306(N).

In an embodiment, the future one of the timer slots $T_0$-$T_R$ for the next missed data packet can be determined based on a predetermined sliding window size (e.g., 10 timer slots), which begins from one of the timer slots $T_0$-$T_R$ in which the next missed data packet is first detected. For example, the missed data packet is first detected during the timer slot $T_3$, and a new event node is determined to be added during the timer slot $T_3$. In this regard, the future one of the timer slots $T_0$-$T_R$ to which the new event node for the next missed data packet is attached would be $T_{13}$.

Figure 4:
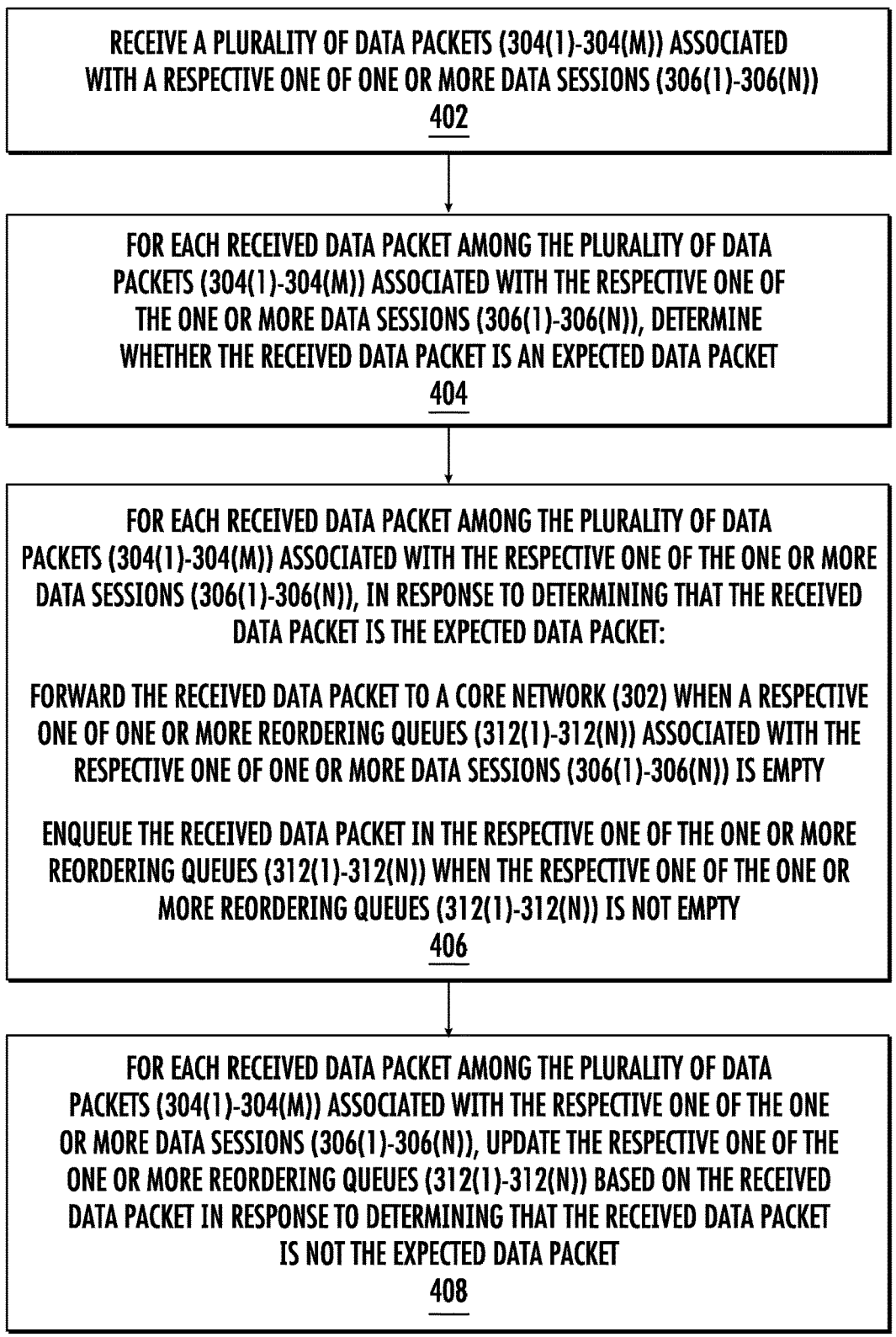
FIG. 4 is a flowchart of an exemplary process that can be employed by the central unit of FIG. 3 to support out-of-order data packet processing.

The central unit 300 can be configured to support out-of-order data packet processing based on a process. In this regard, FIG. 4 is a flowchart of an exemplary process 400 that can be employed by the central unit 300 of FIG. 3 to support out-of-order data packet processing.

Herein, the central unit 300 receives the data packets 304(1)-304(M) associated with a respective one of the data sessions 306(1)-306(N) (block 402). For each received data packet among the data packets 304(1)-304(M) associated with the respective one of the data sessions 306(1)-306(N), the central unit 300 determines whether the received data packet is an expected data packet (block 404). For each received data packet among the data packets 304(1)-304(M) associated with the respective one of the data sessions 306(1)-306(N), in response to determining that the received data packet is the expected data packet, the central unit 300 forwards the received data packet to the core network 302 when a respective one of the reordering queues 312(1)-312(N) associated with the respective one of the data sessions 306(1)-306(N) is empty, or to enqueue the received data packet in the respective one of the reordering queues 312(1)-312(N) when the respective one of the reordering queues 312(1)-312(N) is not empty (block 406). For each received data packet among the data packets 304(1)-304(M) associated with the respective one of the data sessions 306(1)-306(N), in response to determining that the received data is not the expected data packet, the central unit 300 updates the respective one of the reordering queues 312(1)-312(N) associated with the respective one of the data sessions 306(1)-306(N) based on the received data packet (block 408).

The process 400 can be further described based on a series of out-of-order data packet processing scenarios. In this regard, FIGS. 5A-5L are schematic diagrams providing exemplary illustrations of a series of out-of-order data processing scenarios that can be handled by the central unit 300 of FIG. 3 based on the process 400 of FIG. 4. Common elements between FIGS. 3 and 5A-5L are shown therein with common element numbers and will not be re-described herein. Notably, the scenarios illustrated herein can be applied to any one or more of the data sessions 306(1)-306(N).

Figure 5A:
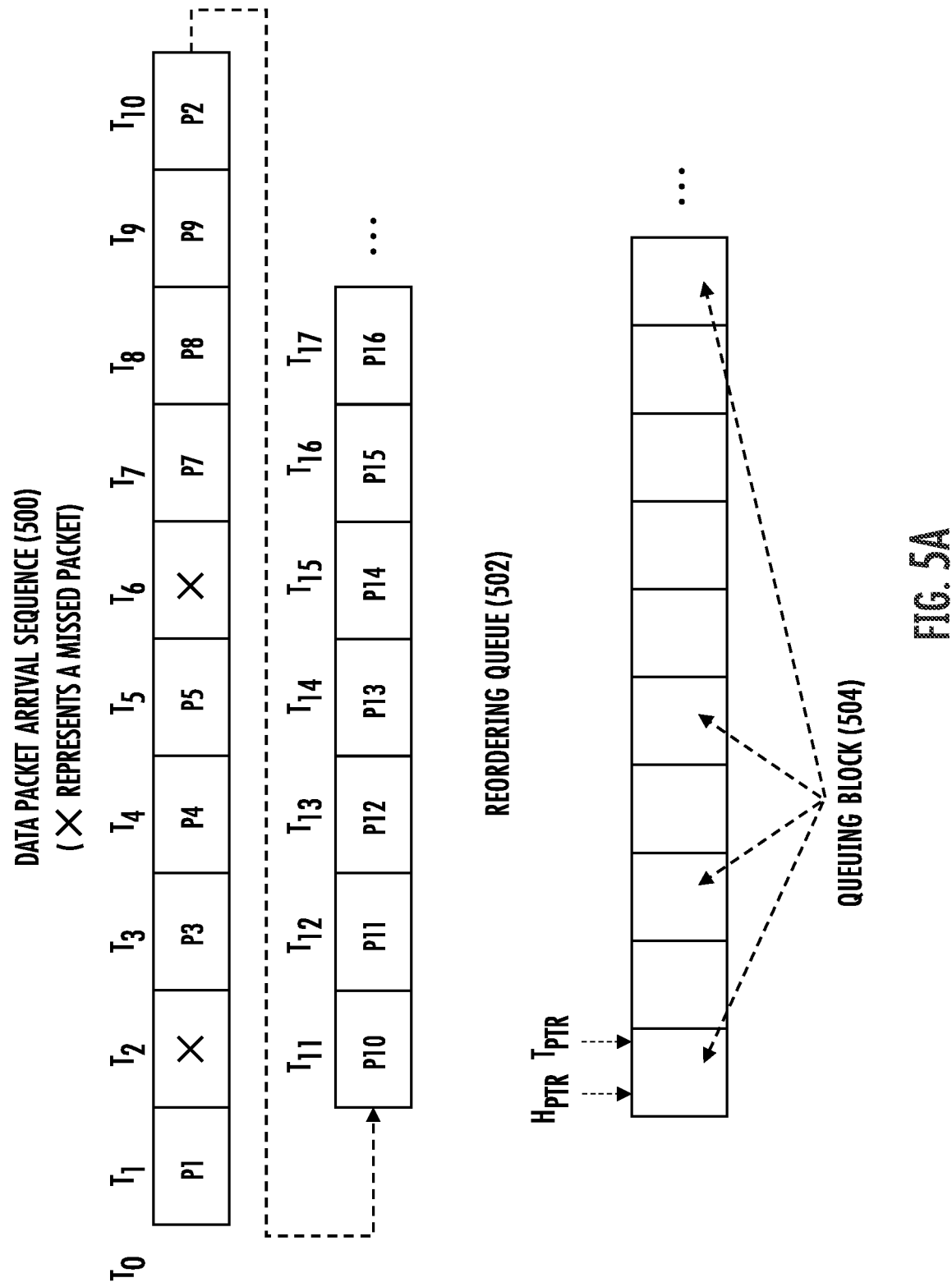

FIG. 5A illustrates an exemplary data packet arrival sequence 500, which can be associated with any of the data sessions 306(1)-306(N), and an exemplary reordering queue 502, which can be any of the reordering queues 312(1)-312(N). The reordering queue 502 includes a plurality of queuing blocks 504, which can be equivalent to the queuing blocks 314(1)-314(K) in any of the reordering queues 312(1)-312(N). Herein, it is assumed that data packets P1, P3-P5, P7-P9, and P10-P16 are received at times $T_1$, $T_3$-$T_5$, $T_7$-$T_9$, and $T_{11}$-$T_{17}$, respectively. In addition, it is assumed that data packets P2 and P6 are missed at times $T_2$ and $T_6$, respectively, and therefore become out-of-order. It is further assumed that the missed data packet P2 is received at time $T_{10}$.

Figure 5B:
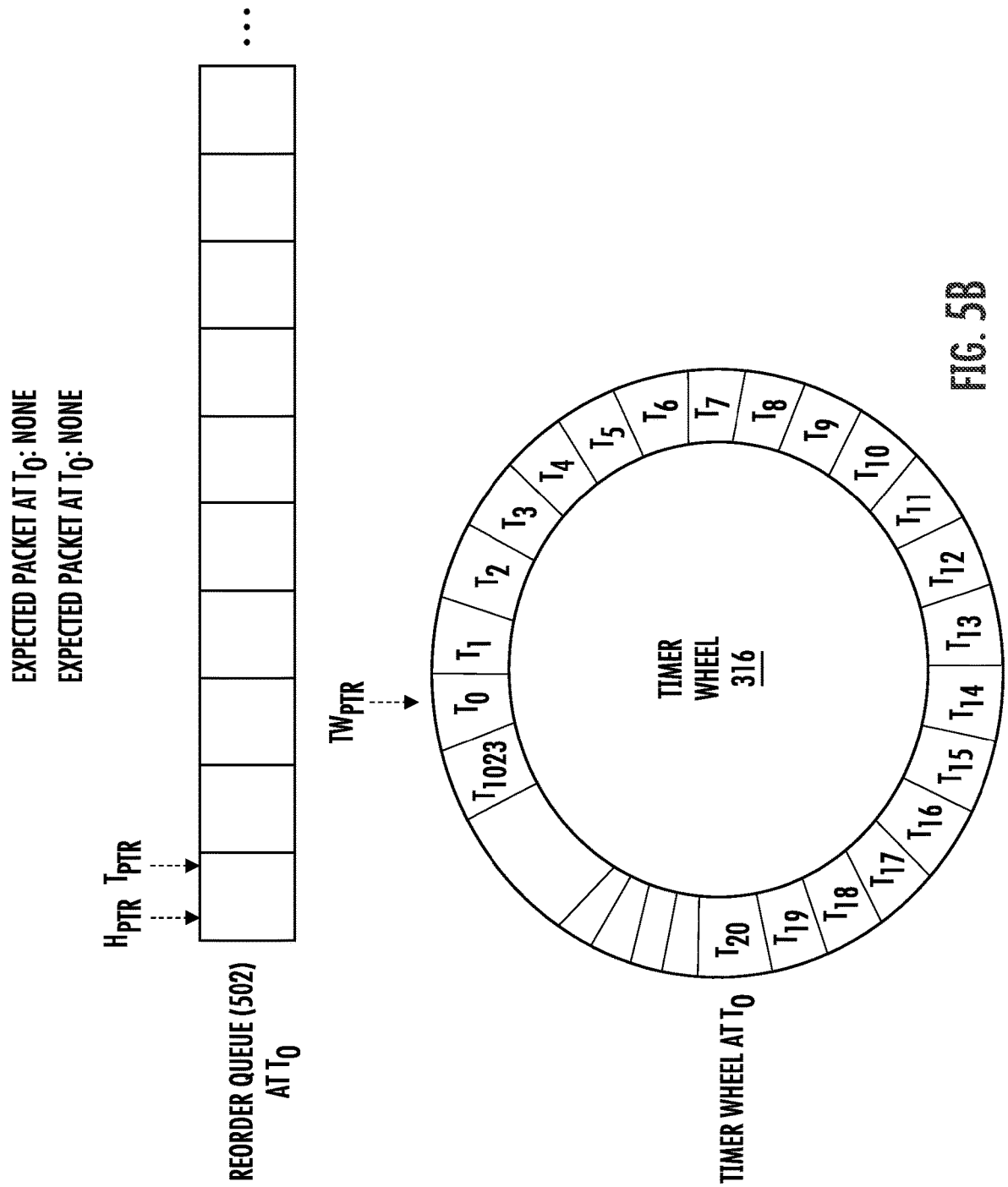

With reference to FIG. 5B, at time $T_0$, the timer wheel pointer $TW_{PTR}$ is pointed to the timer slot $T_0$. At time $T_0$, it is assumed that the data session corresponding to the data packet arrival sequence 500 has not started. As such, the control circuit 308 neither expects, nor receives, any of the data packets P1-P16. Accordingly, the reordering queue 502 is empty and the head pointer HPTR and the tail pointer TPTR both point to the first queuing block of the reordering queue 502.

Figure 5C:
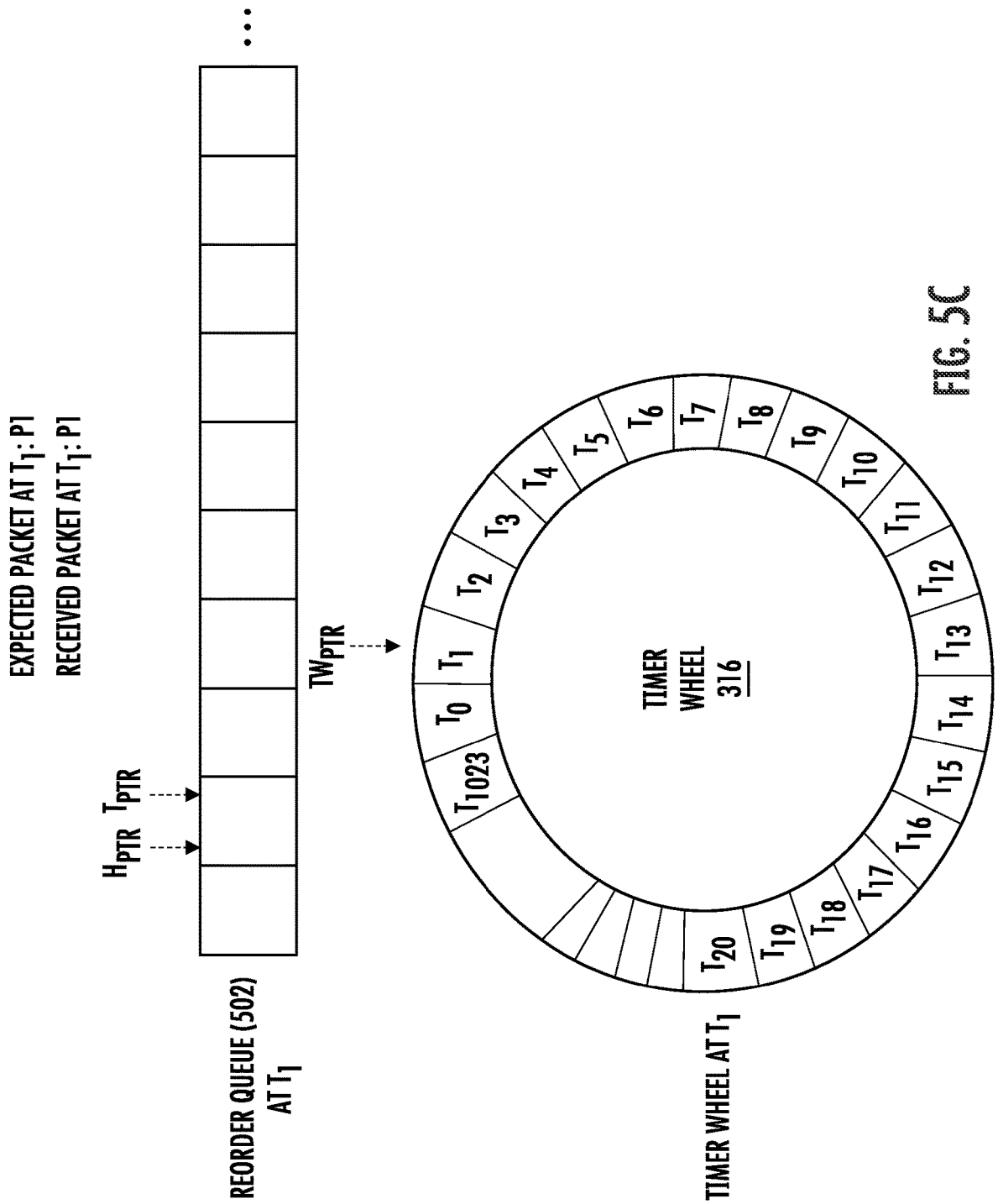

With reference to FIG. 5C, at time $T_1$, the control circuit 308 moves the timer wheel pointer $TW_{PTR}$ to the timer slot $T_1$. At time $T_1$, the control circuit 308 expects and receives data packet P1. In the meantime, the reordering queue 502 remains empty. Accordingly, the control circuit 308 forwards the received data packet P1 to the core network 302. In addition, the control circuit 308 moves the head pointer HPTR and the tail pointer TPTR to the second queuing block of the reordering queue 502.

With reference to FIG. 5D, at time $T_2$, the control circuit 308 moves the timer wheel pointer $TW_{PTR}$ to the timer slot $T_2$. At time $T_2$, the control circuit 308 expects but fails to receive the data packet P2. In the meantime, the reordering queue 502 remains empty and the head pointer HPTR and the tail pointer TPTR both point to the second queuing block of the reordering queue 502.

With reference to FIG. 5E, at time $T_3$, the control circuit 308 moves the timer wheel pointer $TW_{PTR}$ to the timer slot $T_3$. At time $T_3$, the control circuit 308 expects data packet P2 but instead receives data packet P3. In this regard, the control circuit 308 detects that the data packet P2 is a missed data packet (a.k.a. out-of-order data packet). Accordingly, the control circuit 308 enqueues the received data packet P3 in a queuing block immediately succeeding the queuing block pointed by the tail pointer TPTR and moves the tail pointer TPTR to the next queuing block in the reordering queue 502 immediately succeeding the received data packet P3. Accordingly, a first queuing gap 506 (e.g., an empty data packet) for the missed data packet P2 is created between the received data packets P1 and P3.

The control circuit 308 further checks whether a reordering timer is currently running for the data session with which the data packet arrival sequence 500 is associated. Herein, the reordering timer is deemed as currently running if a respective one of the event nodes 318(1)-318(L) for the data session is attached to a future timer slot (a.k.a. any timer slot later than present timer slot $T_3$) in the timer wheel 316.

Given that the data packet P2 is the first missed data packet in the data packet arrival sequence 500, the reordering timer will not be currently running. Further assuming that the lifespan for any missed data packet is set to a duration of ten (10) timer slots, the control circuit 308 will therefore attach an event node 508 to the timer slot $T_{13}$, given that the missed data packet P2 is detected during the timer slot $T_3$. In a non-limiting example, the event node 508 includes an identification of the data session with which the data packet arrival sequence 500 is associated and identification of the missed data packet P2.

Figure 5F:
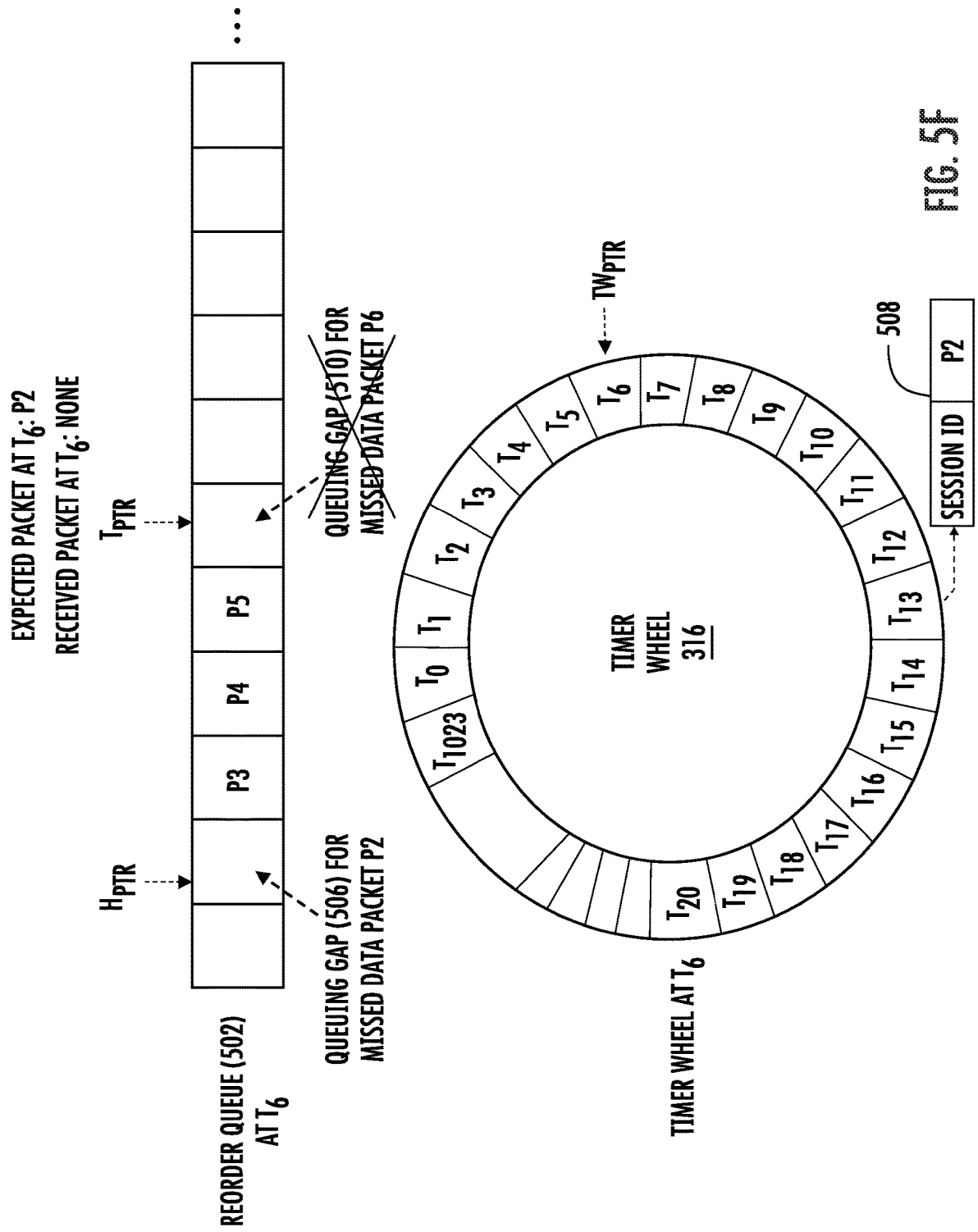

With reference to FIG. 5F, at time $T_6$, the control circuit 308 moves the timer wheel pointer $TW_{PTR}$ to the timer slot $T_6$. At time $T_6$, the control circuit 308 expects the data packet P2 but fails to receive anything. In the meantime, the reordering queue 502 is not empty and the tail pointer TPTR points to the sixth queuing block of the reordering queue 502.

Figure 5G:
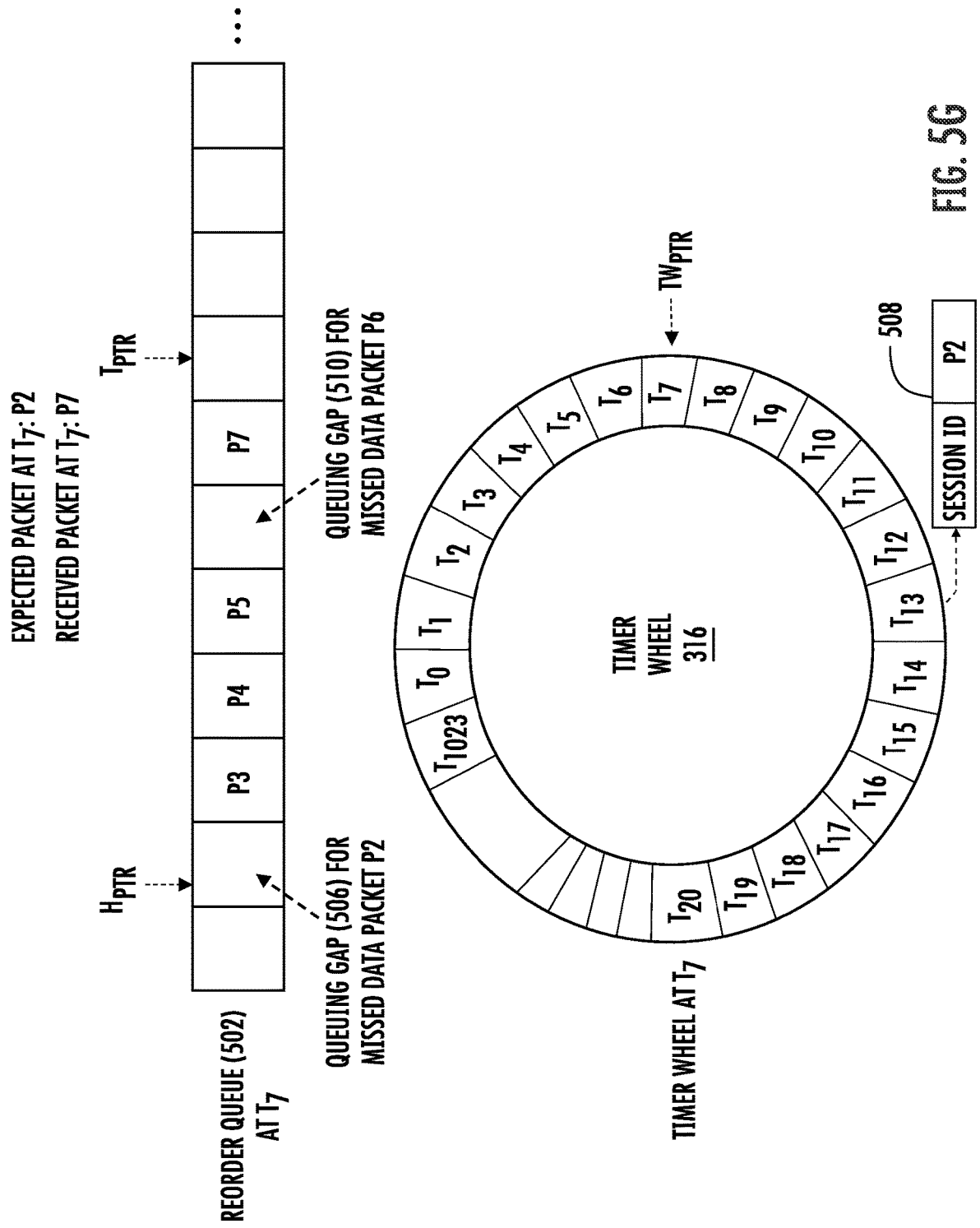

With reference to FIG. 5G, at time $T_7$, the control circuit 308 moves the timer wheel pointer $TW_{PTR}$ to the timer slot $T_7$. At time $T_7$, the control circuit 308 expects the data packet P2 but receives data packet P7. Given that the reordering queue 502 is not empty, the control circuit 308 enqueues the received data packet P7 in a queuing block immediately succeeding the queuing block indicated by the tail pointer TPTR and then moves the tail pointer TPTR to the next queuing block in the reordering queue 502 immediately succeeding the received data packet P7. Accordingly, a second queuing gap 510 (e.g., an empty data packet) for the missed data packet P6 is created between the received data packets P5 and P7. Given that the event node 508 has been created for the missed data packet P2 and attached to the further timer slot $T_{13}$ in the timer wheel 316, the control circuit 308 will conclude that the reordering timer for the data session is currently running. As a result, the control circuit 308 will not create a new event node for the missed data packet P6.

Figure 5H:
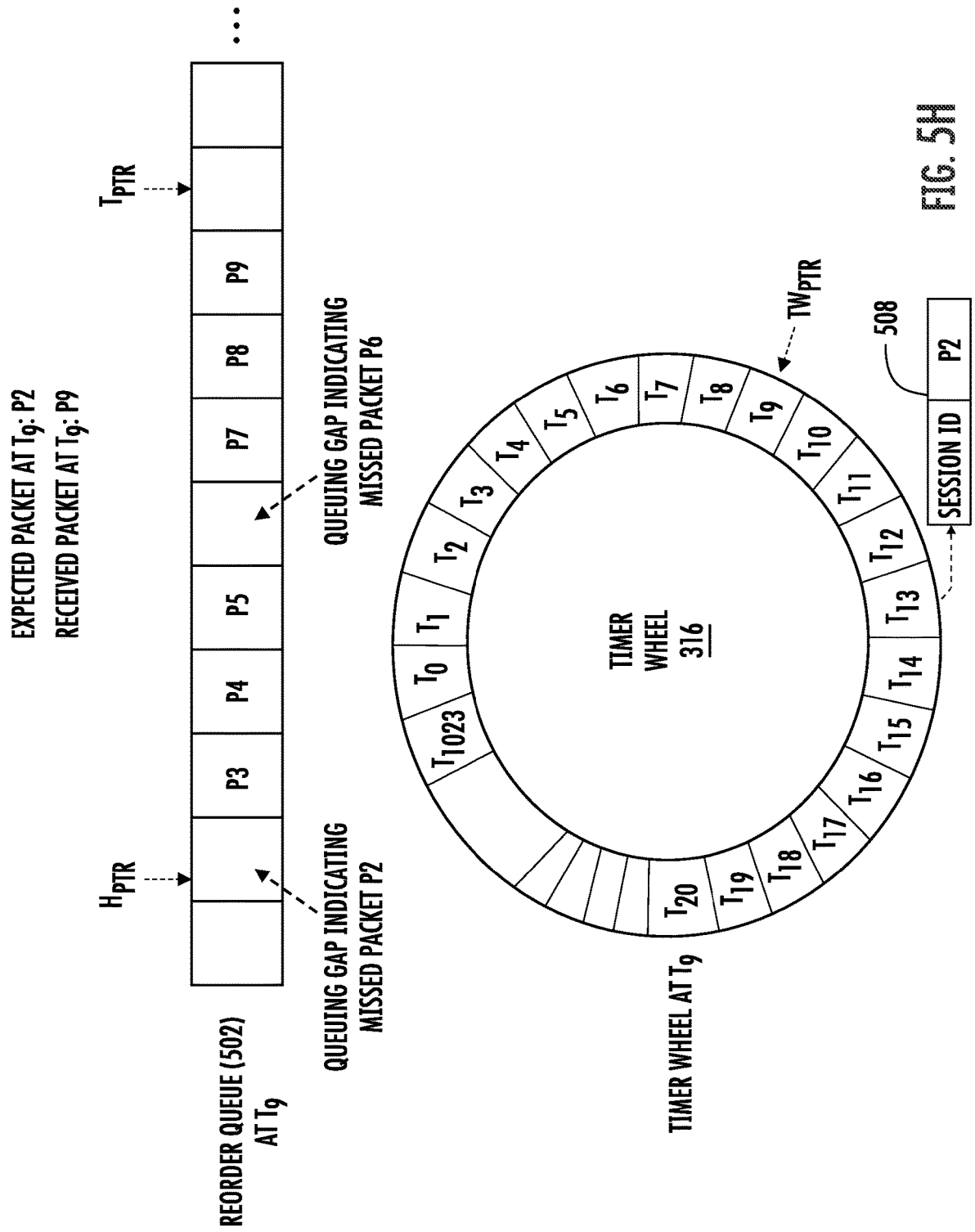

With reference to FIG. 5H, at time $T_9$, the control circuit 308 moves the timer wheel pointer $TW_{PTR}$ to the timer slot $T_9$. At time $T_9$, the control circuit 308 expects the data packet P2 but receives data packet P9. Given that the reordering queue 502 is not empty, the control circuit 308 enqueues the received data packet P9 in the queuing block indicated by the tail pointer TPTR and then moves the tail pointer TPTR to the next queuing block in the reordering queue 502.

Figure 5I:
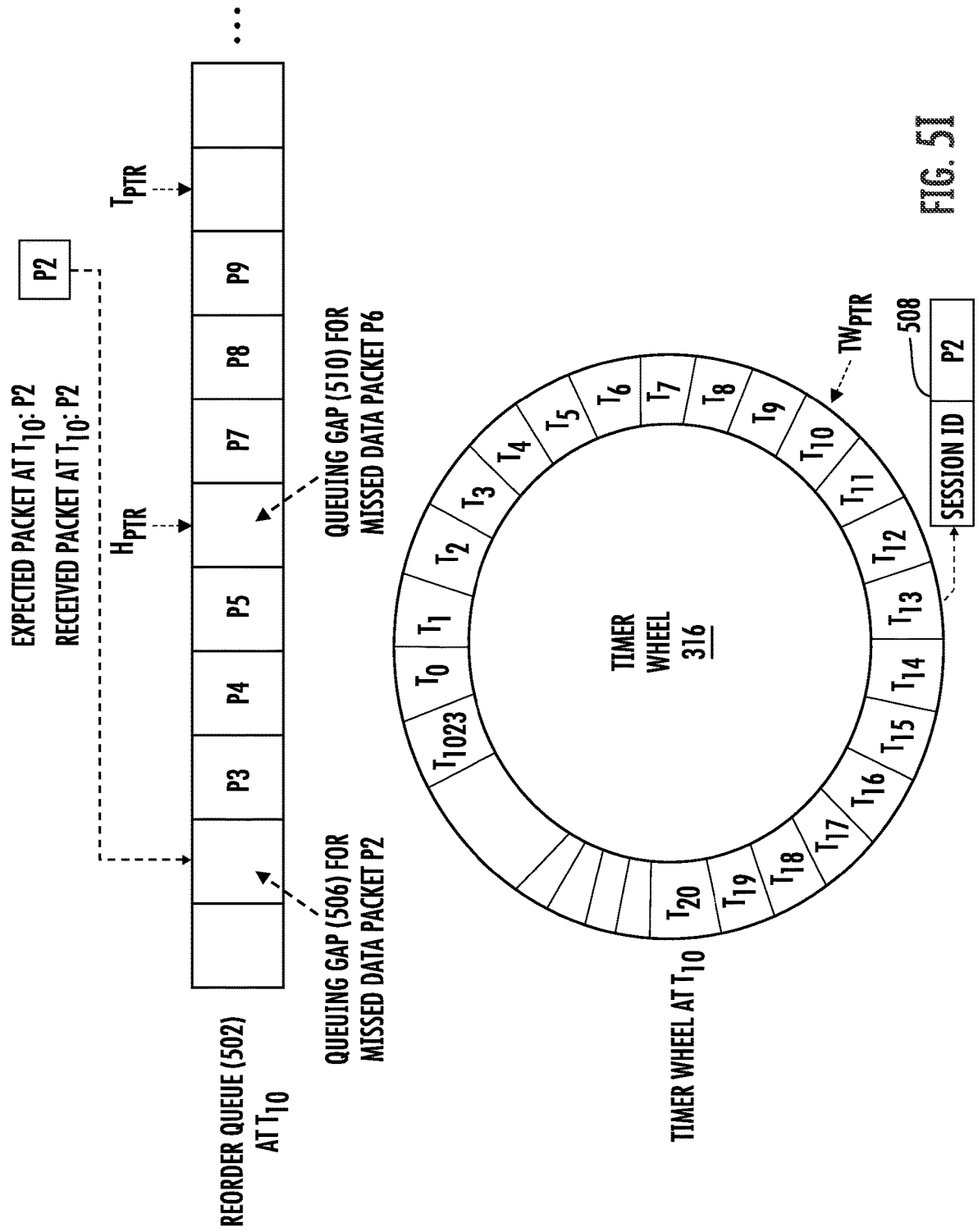

With reference to FIG. 5I, at time $T_{10}$, the control circuit 308 moves the timer wheel pointer $TW_{PTR}$ to the timer slot $T_{10}$. At time $T_{10}$, the control circuit 308 expects and receives the missed data packet P2. In this regard, the control circuit 308 inserts the received data packet P2 into the first queuing gap 506, which was created at time $T_3$ for the missed data packet P2. Notably, the data packets P2-P5 as enqueued in the reordering queue 502 are in order. As a result, the control circuit 308 forwards the data packets P2-P5 to the core network 302. The control circuit 308 then moves the head pointer HPTR to point to the second queuing gap 510, which indicates the next missed data packet P6 in the said data session.

Figure 5J:
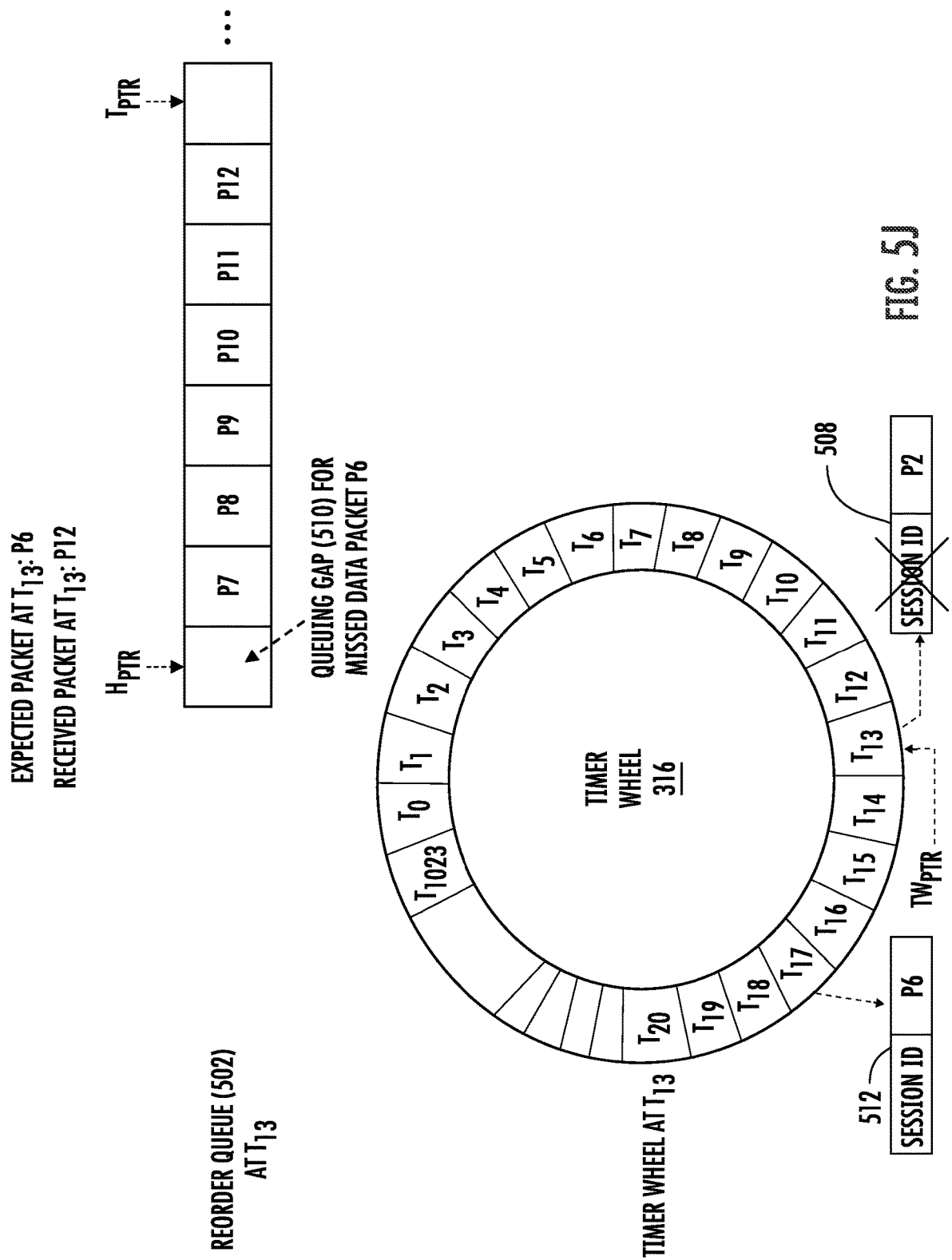

With reference to FIG. 5J, at time $T_{13}$, the control circuit 308 moves the timer wheel pointer $TW_{PTR}$ to the timer slot $T_{13}$. At time $T_{13}$, the control circuit 308 expects the missed data packet P6 but receives the data packet P12. Accordingly, the control circuit 308 enqueues the received data packet P12 in the reordering queue 502 and moves the tail pointer TPTR accordingly.

The control circuit 308 also checks the timer wheel 316 to determine that the event node 508 is attached to the timer slot $T_{13}$. Given that the event node 508 was created for the missed data packet P2, which has already been received during timer slot $T_{10}$, the control circuit 308 can simply remove the event node 508.

If the missed data packet P2 has not been received during the timer slot $T_{13}$, the received data packets P3-P5 would remain in the reordering queue 502. As such, the control circuit 308 will consider the missed data packet P2 as being permanently lost and, accordingly, forward the received data packets P3-P5 to the core network 302 and move the tail pointer TPTR accordingly. The control circuit 308 then removes the event node 508.

After removing the event node 508, the control circuit 308 will create another event node 512 for the missed data packet P6. Since the lifespan for any missed data packet is set to the duration of 10 timer slots and the missed data packet P6 was detected during the timer slot $T_7$, the control circuit 308 will attach the event node 512 to the timer slot $T_{17}$.

Figure 5K:
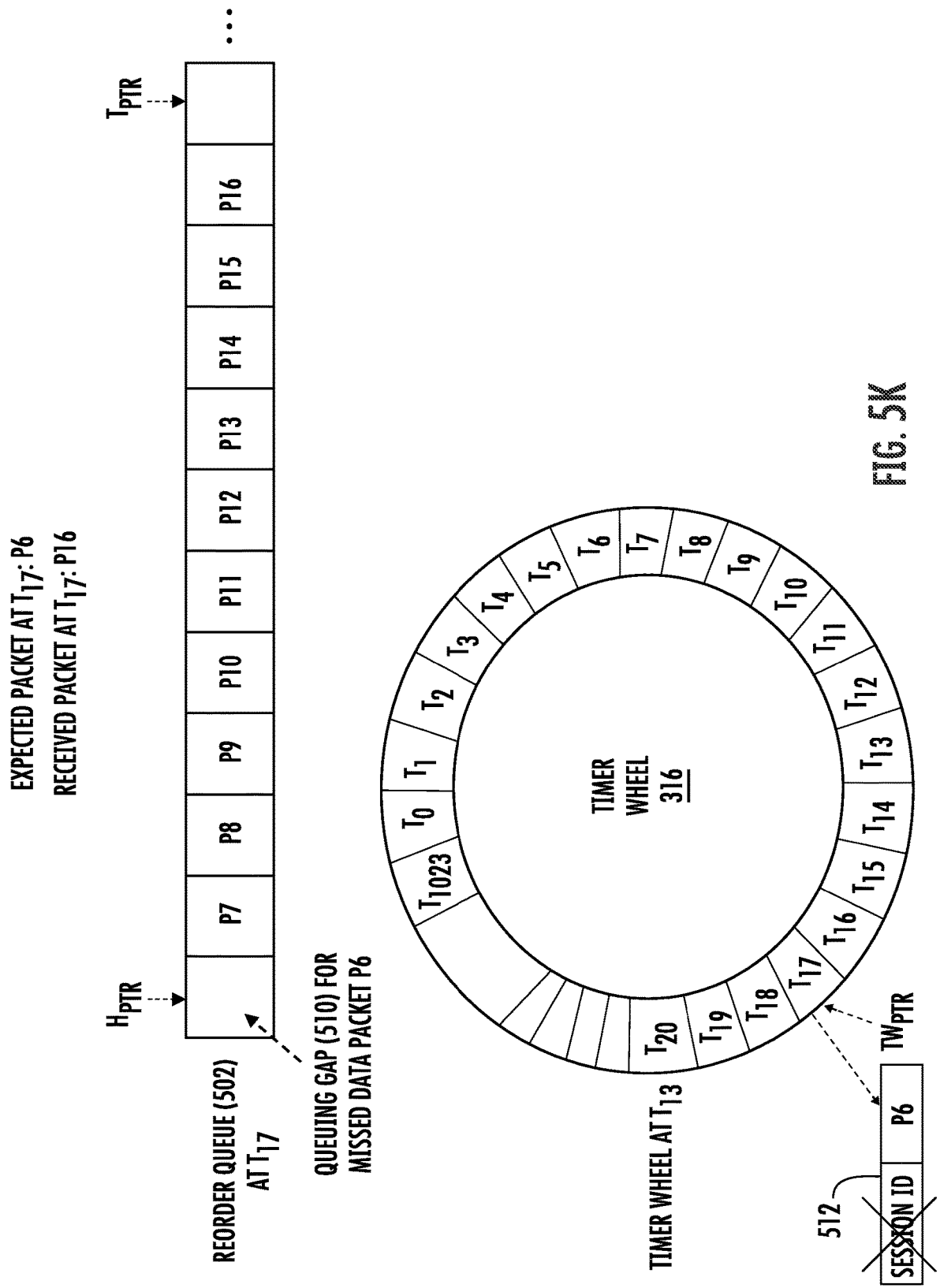

With reference to FIG. 5K, at time $T_{17}$, the control circuit 308 moves the timer wheel pointer $TW_{PTR}$ to the timer slot $T_{17}$. At time $T_{17}$, the control circuit 308 expects the missed data packet P6 but receives the data packet P16 instead. The control circuit 308 also determines that the event node 512, which was created to indicate the lifespan of the missed data packet P6, is attached to the timer slot $T_{17}$. As such, the control circuit 308 concludes that the missed data packet P6 has been permanently lost and removes the event node 512 as a result. Since the reordering queue 502 is not empty, the control circuit 308 will then forward the received data packets P7-P16 to the core network 302.

Figure 5L:
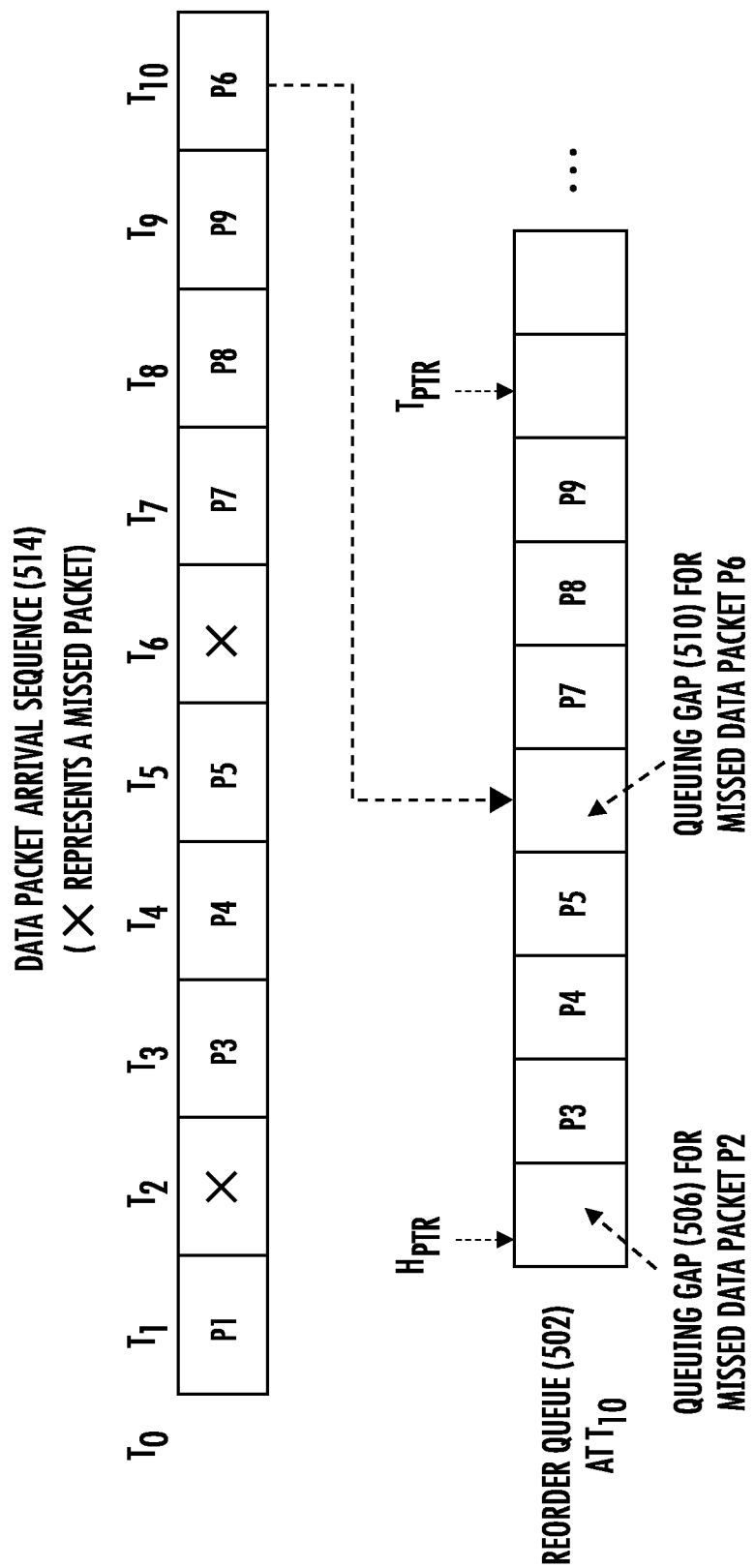

FIG. 5L illustrates another exemplary data packet arrival sequence 514, which can be associated with any of the data sessions 306(1)-306(N). In this example, the control circuit 308 expects the missed data packet P2 during the timer slot $T_{10}$ but received another missed data packet P6 instead. In this regard, the control circuit 308 will insert the received data packet P6 into the second queuing gap 510, which was created for the missed data packet P6.

The various scenarios described in FIGS. 5A-5L can be summarized in two flowcharts, as described with reference to FIGS. 6 and 7. Elements in FIG. 3 are referenced in conjunction with FIG. 6 and will not be redescribed herein.

Figure 6:
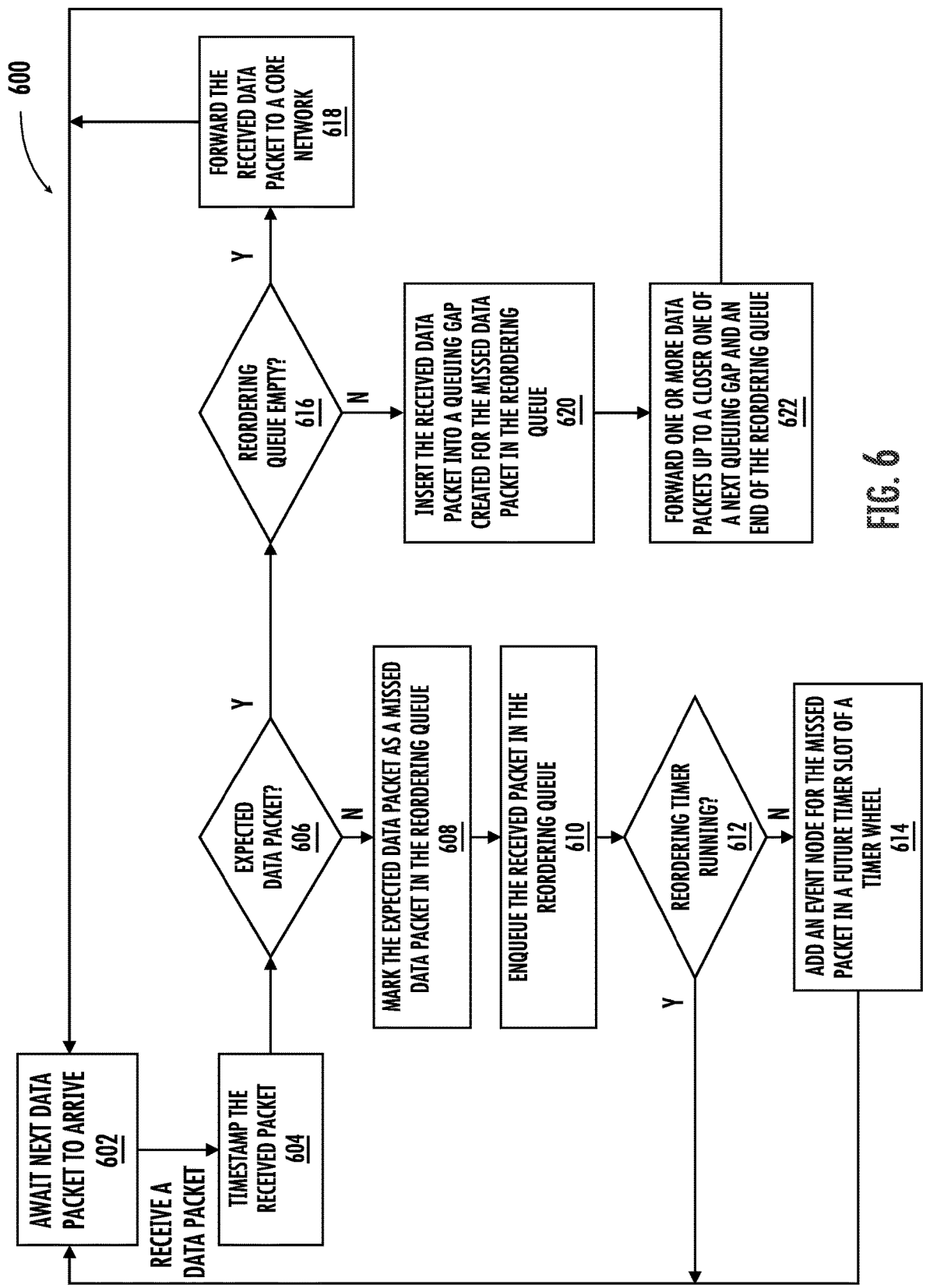
FIG. 6 is a flowchart of an exemplary process that can be employed by the central unit of FIG. 3 in response to receiving a data packet.

FIG. 6 is a flowchart of an exemplary process 600 that can be employed by the central unit 300 of FIG. 3 in response to receiving any of the data packets 304(1)-304(M) in a respective one of the data sessions 306(1)-306(N). The control circuit 308 is configured to await a data packet among the data packets 304(1)-304(M) to arrive (block 602). When a data packet is received, the control circuit 308 timestamps the received data packet (block 604). The control circuit 308 then checks whether the received data packet is an expected data packet (block 606). If the received data packet is not the expected data packet, the control circuit 308 marks the expected data packet as a missed data packet in a respective one of the reordering queues 312(1)-312(N) (block 608). The control circuit 308 then enqueues the received data packet in the respective one of the reordering queues 312(1)-312(N) (block 610). The control circuit 308 then checks whether the reordering timer is running for the respective one of the data sessions 306(1)-306(N) (block 612). If the reordering timer is running, the control circuit 308 returns to block 602 to await a next one of the data packets 304(1)-304(M) in the respective one of the data sessions 306(1)-306(N). Otherwise, the control circuit 308 adds an event node for the missed data packet in a future one of the timer slots $T_0$-$T_R$ of the timer wheel 316 (block 614). In a non-limiting example, an exact location of the future one of the timer slots $T_0$-$T_R$ can be expressed as $T_c+T_r$, wherein $T_c$ represents a current time and $T_r$ represents a reordering timer value. The control circuit 308 then returns to block 602 to await a next one of the data packets 304(1)-304(M) in the respective one of the data sessions 306(1)-306(N).

If the control circuit 308 determines that the received data packet is the expected data packet in block 606, the control circuit 308 will further check whether the respective one of the reordering queues 312(1)-312(N) is empty (block 616). If the respective one of the reordering queues 312(1)-312(N) is indeed empty, the control circuit 308 will simply forward the received data packet to the core network 302 (block 618) and then returns to block 602 to await a next one of the data packets 304(1)-304(M) in the respective one of the data sessions 306(1)-306(N). If the respective one of the reordering queues 312(1)-312(N) is not empty, the control circuit 308 will insert the received data packet into a queuing gap created for the missed data packet in the respective one of the reordering queues 312(1)-312(N) (block 620). The control circuit 308 then forwards one or more data packets up to a closer one of a next queuing gap (a.k.a. a next missed data packet) or an end (a.k.a. tail) of the respective one of the reordering queues 312(1)-312(N) (block 622). The control circuit 308 then returns to block 602 to await a next one of the data packets 304(1)-304(M) in the respective one of the data sessions 306(1)-306(N).

Figure 7:
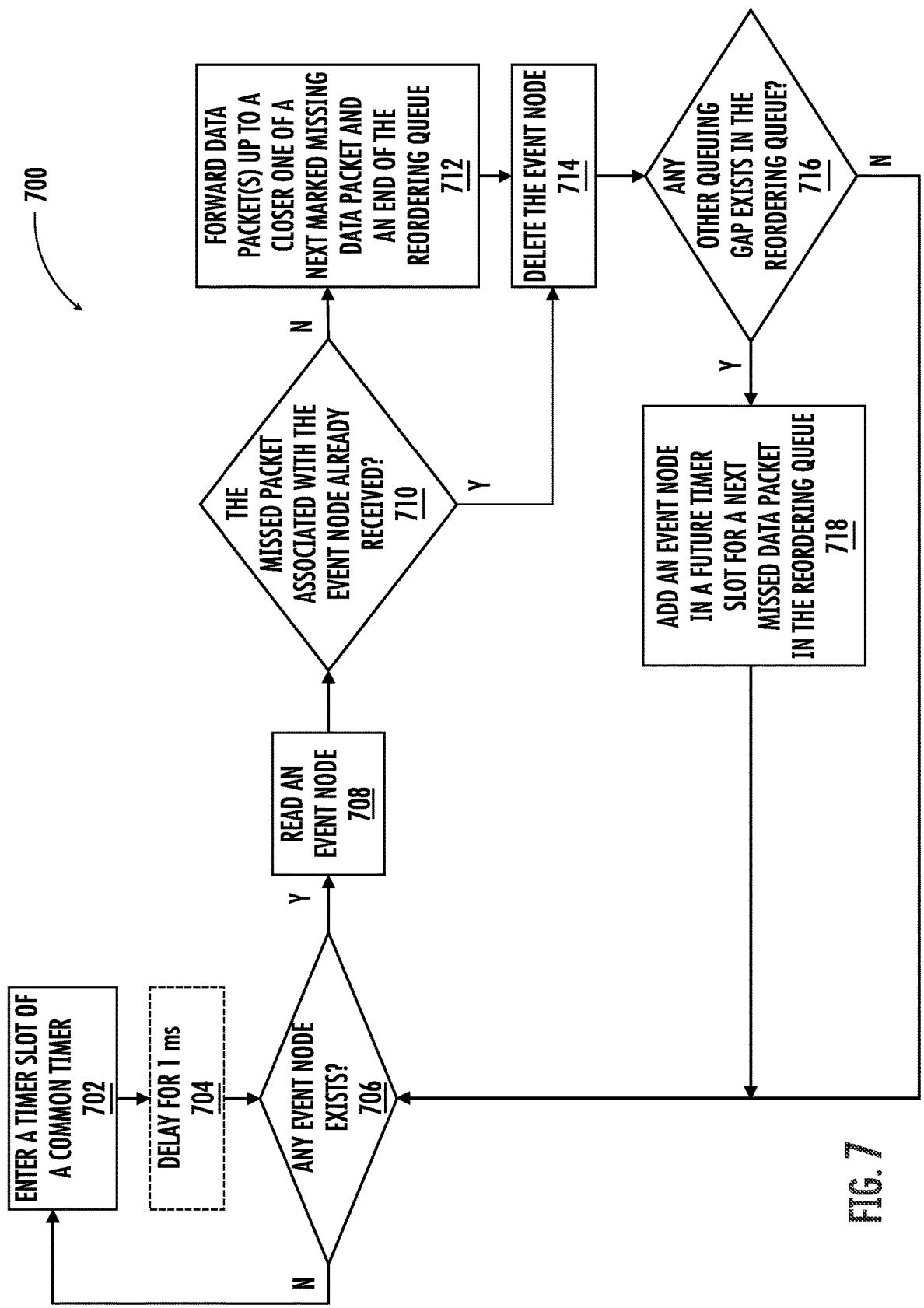
FIG. 7 is a flowchart of an exemplary process that can be employed by the central unit of FIG. 3 in response to detecting an attached event node in any of a plurality of timer slots in a timer wheel configured by the central unit.

FIG. 7 is a flowchart of an exemplary process 700 that can be employed by the central unit of FIG. 3 in response to detecting an attached event node in any of the timer slots $T_0$-$T_R$ in the timer wheel 316. Elements in FIG. 3 are referenced in conjunction with FIG. 7 and will not be redescribed herein.

The control circuit 308 kicks off the process 700 each time when entering a respective one of the timer slots $T_0$-$T_R$ in the timer wheel 316 (block 702). The control circuit 308 may optionally delay for one millisecond (1 ms) upon entering the respective one of the timer slots $T_0$-$T_R$ (block 704). The control circuit 308 then checks to determine whether there is any event node attached to the respective one of the timer slots $T_0$-$T_R$ (block 706). The control circuit 308 will return to block 702 if no event node is attached to the respective one of the timer slots $T_0$-$T_R$. Otherwise, the control circuit 308 reads the event node attached to the respective one of the timer slots $T_0$-$T_R$ to thereby identify the missed data packet (block 708). The control circuit 308 then determines whether the missed data packet has been received (block 710). If the missed data packet has not been received, the control circuit 308 will forward to the core network 302 one or more data packets in the respective one of the reordering queues 312(1)-312(N), up to a closer one of a next queuing gap (a.k.a. a next missed data packet) or an end (a.k.a. tail) of the respective one of the reordering queues 312(1)-312(N) (block 712).

Regardless of whether the missed data packet has been received, the control circuit 308 will delete the event node attached to the respective one of the timer slots $T_0$-$T_R$ (block 714). The control circuit 308 then checks to see whether any other queuing gap has been created in the respective one of the reordering queues 312(1)-312(N) to mark another missed data packet (block 716). If yes, the control circuit 308 will add an event in a future one of the timer slots $T_0$-$T_R$ for a next missed data packet marked by the next queuing gap in the respective one of the reordering queues 312(1)-312(N) (block 718). The control circuit 308 then returns to block 706 to read another event node, if any, attached to the respective one of the timer slots $T_0$-$T_R$.

Figure 8:
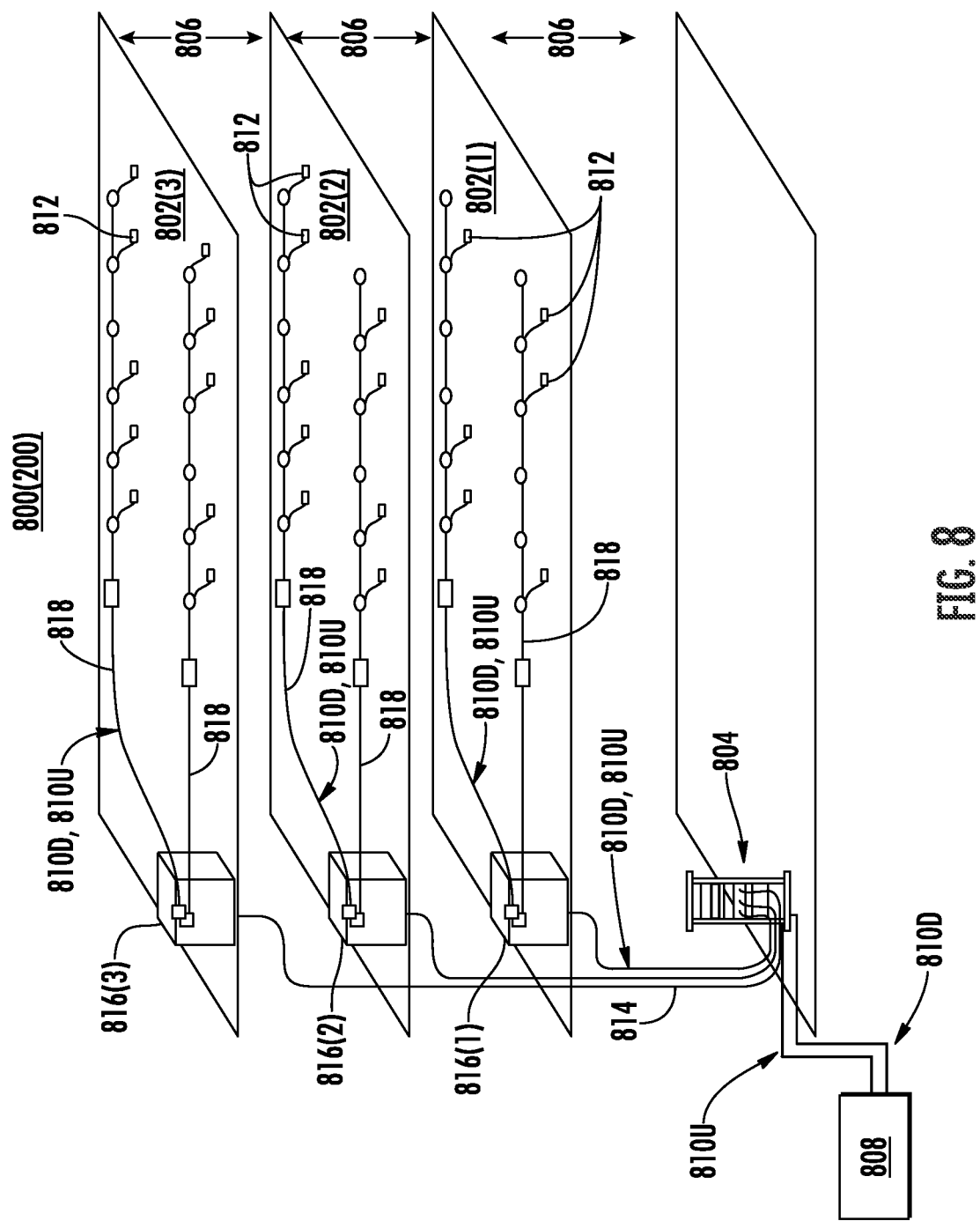
FIG. 8 is a partial schematic cut-away diagram of an exemplary building infrastructure in a WCS, such as the WCS of FIG. 2 that includes the central unit of FIG. 3 for supporting out-of-order packet processing.

The WCS 200 of FIG. 2, which can include the central unit 300 in FIG. 3, can be provided in an indoor environment as illustrated in FIG. 8. FIG. 8 is a partial schematic cut-away diagram of an exemplary building infrastructure 800 in a WCS, such as the WCS 200 of FIG. 2 that includes the central unit 300 of FIG. 3 for supporting out-of-order packet processing. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

Figure 9:
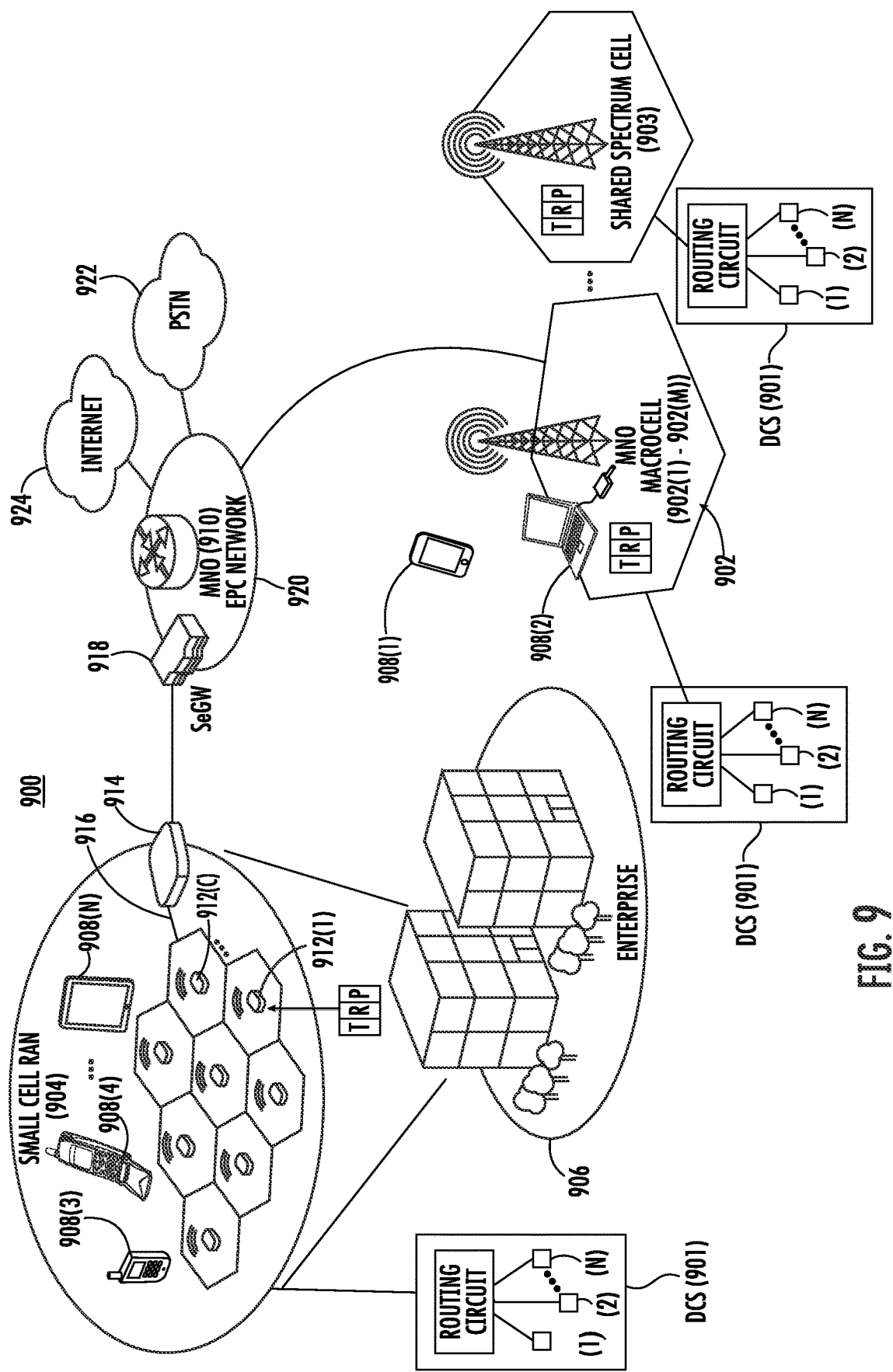
FIG. 9 is a schematic diagram of an exemplary mobile telecommunications environment that can includes the WCS of FIG. 2 that includes the central unit of FIG. 3 for supporting out-of-order packet processing.

The WCS 200 of FIG. 2 and the central unit 300 of FIG. 3, configured to support out-of-order packet processing, can also be interfaced with different types of radio nodes of service providers and/or supporting service providers, including macrocell systems, small cell systems, and remote radio heads (RRH) systems, as examples. For example, FIG. 9 is a schematic diagram of an exemplary mobile telecommunications environment 900 (also referred to as "environment 900") that includes radio nodes and cells that may support shared spectrum, such as unlicensed spectrum, and can be interfaced to shared spectrum WCSs 901 supporting coordination of distribution of shared spectrum from multiple service providers to remote units to be distributed to subscriber devices. The shared spectrum WCSs 901 can include the WCS 200 of FIG. 2 that includes the central unit 300 of FIG. 3, as an example.

The environment 900 includes exemplary macrocell RANs 902(1)-902(M) ("macrocells 902(1)-902(M)") and an exemplary small cell RAN 904 located within an enterprise environment 906 and configured to service mobile communications between a user mobile communications device 908(1)-908(N) to a mobile network operator (MNO) 910. A serving RAN for the user mobile communications devices 908(1)-908(N) is a RAN or cell in the RAN in which the user mobile communications devices 908(1)-908(N) have an established communications session with the exchange of mobile communications signals for mobile communications. Thus, a serving RAN may also be referred to herein as a serving cell. For example, the user mobile communications devices 908(3)-908(N) in FIG. 9 are being serviced by the small cell RAN 904, whereas the user mobile communications devices 908(1) and 908(2) are being serviced by the macrocell 902. The macrocell 902 is an MNO macrocell in this example. However, a shared spectrum RAN 903 (also referred to as "shared spectrum cell 903") includes a macrocell in this example and supports communications on frequencies that are not solely licensed to a particular MNO, such as CBRS for example, and thus may service user mobile communications devices 908(1)-908(N) independent of a particular MNO. For example, the shared spectrum cell 903 may be operated by a third party that is not an MNO and wherein the shared spectrum cell 903 supports CBRS. Also, as shown in FIG. 9, the MNO macrocell 902, the shared spectrum cell 903, and/or the small cell RAN 904 can interface with a shared spectrum WCS 901 supporting coordination of distribution of shared spectrum from multiple service providers to remote units to be distributed to subscriber devices. The MNO macrocell 902, the shared spectrum cell 903, and the small cell RAN 904 may be neighboring radio access systems to each other, meaning that some or all can be in proximity to each other such that a user mobile communications device 908(3)-908(N) may be able to be in communications range of two or more of the MNO macrocell 902, the shared spectrum cell 903, and the small cell RAN 904 depending on the location of the user mobile communications devices 908(3)-908(N).

In FIG. 9, the mobile telecommunications environment 900 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 900 includes the enterprise environment 906 in which the small cell RAN 904 is implemented. The small cell RAN 904 includes a plurality of small cell radio nodes 912(1)-912(C). Each small cell radio node 912(1)-912(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 9, the small cell RAN 904 includes one or more services nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g., evolved packet core (EPC) network in a 4G network, or 5G Core in a 5G network) of the MNO 910. The network 920 is typically configured to communicate with a public switched telephone network (PSTN) 922 to carry circuit-switched traffic, as well as for communicating with an external packet-switched network such as the Internet 924.

The environment 900 also generally includes a node (e.g., eNodeB or gNodeB) base station, or "macrocell" 902. The radio coverage area of the macrocell 902 is typically much larger than that of a small cell where the extent of coverage often depends on the base station configuration and surrounding geography. Thus, a given user mobile communications device 908(3)-908(N) may achieve connectivity to the network 920 (e.g., EPC network in a 4G network, or 5G Core in a 5G network) through either a macrocell 902 or small cell radio node 912(1)-912(C) in the small cell RAN 904 in the environment 900.

Figure 10:
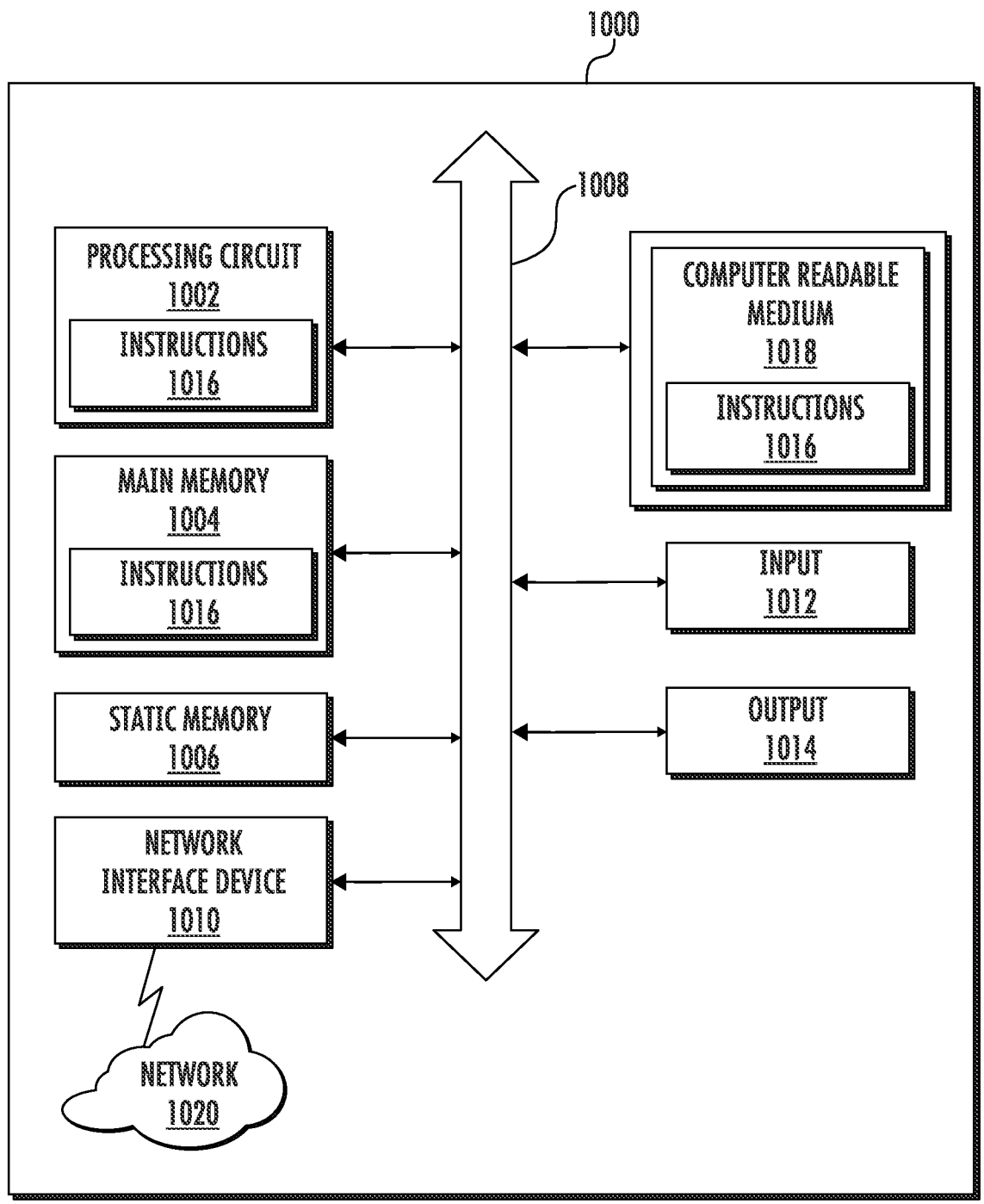
FIG. 10 is a schematic diagram of a representation of an exemplary computer system that can be included in or interfaced with any of the components in the WCS of FIG. 2 and the central unit in FIG. 3 for supporting out-of-order packet processing, wherein the exemplary computer system is configured to execute instructions from an exemplary computer-readable medium.

Any of the circuits in the WCS 200 of FIG. 2 and the central unit 300 of FIG. 3, such as the control circuit 308, can include a computer system 1000, such as that shown in FIG. 10, to carry out their functions and operations. With reference to FIG. 10, the computer system 1000 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random-access memory (DRAM) such as synchronous DRAM (SDRAM), etc.), and a static memory 1006 (e.g., flash memory, static random-access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory. In a non-limiting example, the processing circuit 1002 and the main memory 1004 can be configured to function as the control circuit 308 and the memory circuit 310 in the central unit 300 of FIG. 3, respectively, to support out-of-order data packet processing according to embodiments of the present disclosure.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting the computer-readable medium 1018. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A central unit, comprising:
a control circuit configured to:
receive a plurality of data packets associated with a respective one of one or more data sessions; and
for each received data packet among the plurality of data packets associated with the respective one of the one or more data sessions:
determine whether the received data packet is an expected data packet;
in response to determining that the received data packet is the expected data packet:
forward the received data packet to a core network node when a respective one of one or more reordering queues associated with the respective one of the one or more data sessions is empty; and
enqueue the received data packet in the respective one of the one or more reordering queues when the respective one of the one or more reordering queues is not empty; and
update the respective one of the one or more reordering queues based on the received data packet in response to determining that the received data packet is not the expected data packet.

2. The central unit of claim 1, further comprising a memory circuit configured to store the one or more reordering queues associated with the one or more data sessions, respectively.

3. The central unit of claim 1, wherein, in response to determining that the received data packet is not the expected data packet, the control circuit is further configured to:

enqueue an empty data packet corresponding to the expected data packet to thereby mark the expected data packet as a missed data packet in the respective one of the one or more reordering queues; and enqueue the received data packet after the empty data packet in the respective one of the one or more reordering queues.

4. The central unit of claim 3, wherein, in response to determining that the received data packet is the expected data packet, the control circuit is further configured to:
insert the received data packet into the empty data packet that marks the expected data packet as the missed data packet; and
forward, to a core network, one or more selected data packets starting from the expected data packet and ending before a closer one of:
a next empty data packet that marks a next missed data packet in the respective one of the one or more reordering queues; and
an end of the respective one of the one or more reordering queues.

5. The central unit of claim 3, wherein, in response to determining that the received data packet is not the expected data packet, the control circuit is further configured to:
determine whether a reordering timer corresponding to the respective one of the one or more data sessions is currently running; and
define the reordering timer for the expected data packet in response to determining that the reordering timer is not currently running.

6. The central unit of claim 5, wherein, in response to determining that the reordering timer is currently running, the control circuit is further configured not to define the reordering timer for the expected data packet until an expiration of the reordering timer.

7. The central unit of claim 6, wherein, at the expiration of the reordering timer, the control circuit is further configured to define the reordering timer to start from a time at which the expected data packet is determined as the missed data packet.

8. The central unit of claim 6, wherein, at the expiration of the reordering timer, the control circuit is further configured to:
determine whether the expected data packet for which the reordering timer is defined has been received; and
in response to determining that the expected data packet has been received, forward one or more selected data packets to the core network node, wherein the one or more selected data packets starts from a first received data packet in the respective one of the one or more reordering queues and ends before a closer one of:
a next empty data packet that marks a next missed data packet in the respective one of the one or more reordering queues; and
an end of the respective one of the one or more reordering queues.

9. A method for supporting out-of-order packet processing in a wireless communications system (WCS), comprising:
receiving a plurality of data packets associated with a respective one of one or more data sessions; and
for each received data packet among the plurality of data packets associated with the respective one of the one or more data sessions:
determining whether the received data packet is an expected data packet;
in response to determining that the received data packet is the expected data packet:

forwarding the received data packet to a core network node when a respective one of one or more reordering queues associated with the respective one of the one or more data sessions is empty; and
enqueuing the received data packet in the respective one of the one or more reordering queues when the respective one of the one or more reordering queues is not empty; and
updating the respective one of the one or more reordering queues based on the received data packet in response to determining that the received data packet is not the expected data packet.

10. The method of claim 9, further comprising, in response to determining that the received data packet is not the expected data packet:
enqueuing an empty data packet corresponding to the expected data packet to thereby mark the expected data packet as a missed data packet in the respective one of the one or more reordering queues; and
enqueuing the received data packet after the empty data packet in the respective one of the one or more reordering queues.

11. The method of claim 10, further comprising, in response to determining that the received data packet is the expected data packet:
inserting the received data packet into the empty data packet that marks the expected data packet as the missed data packet; and
forwarding, to a core network, one or more selected data packets starting from the expected data packet and ending before a closer one of:
a next empty data packet that marks a next missed data packet in the respective one of the one or more reordering queues; and
an end of the respective one of the one or more reordering queues.

12. The method of claim 10, further comprising, in response to determining that the received data packet is not the expected data packet:
determining whether a reordering timer corresponding to the respective one of the one or more data sessions is currently running; and
defining the reordering timer for the expected data packet in response to determining that the reordering timer is not currently running.

13. The method of claim 12, further comprising, in response to determining that the reordering timer is currently running, not defining the reordering timer for the expected data packet until an expiration of the reordering timer.

14. The method of claim 13, further comprising, at the expiration of the reordering timer, defining the reordering timer to start from a time at which the expected data packet is determined as the missed data packet.

15. The method of claim 13, further comprising, at the expiration of the reordering timer:
determining whether the expected data packet for which the reordering timer is defined has been received; and
in response to determining that the expected data packet has been received, forwarding one or more selected data packets to the core network node, wherein the one or more selected data packets starts from a first received data packet in the respective one of the one or more reordering queues and ends before a closer one of:
a next empty data packet that marks a next missed data packet in the respective one of the one or more reordering queues; and an end of the respective one of the one or more reordering queues.

16. A wireless communications system (WCS), comprising:
a central unit coupled to a core network, the central unit comprises a control circuit configured to:
receive a plurality of data packets associated with a respective one of one or more data sessions; and
for each received data packet among the plurality of data packets associated with the respective one of the one or more data sessions:
determine whether the received data packet is an expected data packet;
in response to determining that the received data packet is the expected data packet:
forward the received data packet to a core network node when a respective one of one or more reordering queues associated with the respective one of the one or more data sessions is empty; and
enqueue the received data packet in the respective one of the one or more reordering queues when the respective one of the one or more reordering queues is not empty; and
update the respective one of the one or more reordering queues based on the received data packet in response to determining that the received data packet is not the expected data packet.

17. The WCS of claim 16, further comprising at least one open radio access network (O-RAN) remote unit coupled to the central unit, the at least one O-RAN remote unit is configured to communicate the plurality of data packets to the central unit in each of the one or more data sessions.

18. The WCS of claim 16, further comprising at least one millimeter wave (mmWave) radio node (RN) coupled to the central unit, the at least one mmWave RN is configured to communicate the plurality of data packets to the central unit in each of the one or more data sessions.

19. The WCS of claim 16, further comprising a distributed communications system (DCS), the DCS comprising a plurality of remote units coupled to the central unit via a plurality of optical fiber-based communications mediums, respectively, wherein at least one of the plurality of remote units is configured to communicate the plurality of data packets to the central unit in each of the one or more data sessions.

20. The WCS of claim 19, wherein:
the central unit comprises:
an electrical-to-optical (E/O) converter configured to:
convert a plurality of downlink communications signals into a plurality of downlink optical communications signals, respectively; and
provide the plurality of downlink optical communications signals to the plurality of remote units, respectively; and
an optical-to-electrical (O/E) converter configured to:
receive a plurality of uplink optical communications signals from the plurality of remote units, respectively; and
convert the plurality of uplink optical communications signals into a plurality of uplink communications signals, respectively, wherein the plurality of uplink communications signals is communicated via the one or more data sessions; and
the plurality of remote units each comprises:
a respective O/E converter configured to convert a respective one of the plurality of downlink optical communications signals into a respective one of the plurality of downlink communications signals; and
a respective E/O converter configured to convert a respective one of the plurality of uplink communications signals into a respective one of the plurality of uplink optical communications signals.

\* \* \* \* \*